United States Patent
Chan et al.

(10) Patent No.: US 7,492,466 B2
(45) Date of Patent: Feb. 17, 2009

(54) OPTICAL IMAGE MEASURING APPARATUS AND OPTICAL IMAGE MEASURING METHOD

(75) Inventors: Kinpui Chan, Yamagata (JP); Masahiro Akiba, Yamagata (JP); Yasufumi Fukuma, Tokyo (JP); Hiroyuki Otsuka, Tokyo (JP); Hisashi Tsukada, Tokyo (JP); Kazuhiko Yumikake, Tokyo (JP)

(73) Assignee: Kabushiki Kaisha Topcon, Tokyo (JP)

( * ) Notice: Subject to any disclaimer, the term of this patent is extended or adjusted under 35 U.S.C. 154(b) by 352 days.

(21) Appl. No.: 11/246,394

(22) Filed: Oct. 11, 2005

(65) Prior Publication Data
US 2006/0077395 A1    Apr. 13, 2006

(30) Foreign Application Priority Data
Oct. 13, 2004    (JP)    ............................. 2004-299036

(51) Int. Cl.
G01B 11/02    (2006.01)
(52) U.S. Cl. .................................. 356/497
(58) Field of Classification Search ................ 356/479, 356/484, 485, 489, 492, 495, 496–498, 503, 356/511, 516
See application file for complete search history.

(56) References Cited

U.S. PATENT DOCUMENTS

| | | | |
|---|---|---|---|
| 5,051,226 A * | 9/1991 | Brustad et al. ............... | 264/511 |
| 5,061,071 A * | 10/1991 | Fujita et al. .................. | 356/489 |
| 5,076,693 A * | 12/1991 | Teramoto ..................... | 356/489 |
| 5,838,485 A * | 11/1998 | de Groot et al. ............ | 356/484 |
| 6,002,480 A * | 12/1999 | Izatt et al. ................... | 356/479 |
| 6,006,128 A * | 12/1999 | Izatt et al. ................... | 600/476 |
| 6,496,267 B1 * | 12/2002 | Takaoka ..................... | 356/497 |

(Continued)

FOREIGN PATENT DOCUMENTS

JP    2001-330558    11/2001

OTHER PUBLICATIONS

N. Tanno; "The imaging technic of the optical coherence tomography and its application to living organism image;" *Kogaku (Japanese Journal of Optics)*; vol. 28; No. 3; 1999; pp. 116-125 and Cover page (11 Sheets total)./Discussed in the specification.

T. Nakajima; "Principle and application of the optical heterodyne method;" *Optical Heterodyne Technology*; 2003; pp. 1-10 and Cover page (7 Sheets total)./Discussed in the specification.

(Continued)

*Primary Examiner*—Patrick J Connolly
*Assistant Examiner*—Scott M Richey
(74) *Attorney, Agent, or Firm*—Edwards Angell Palmer & Dodge LLP

(57) ABSTRACT

Provided is an optical image measuring apparatus forming a three-dimensional image based on tomographic images of an object, acquired at various depths even when the object moves during measurement. Including a half mirror (6) for dividing a light beam signal light (S) and reference light (R), a frequency shifter (8), a reference mirror (9) and a piezoelectric element (9A) used to change an optical path length of the reference light (R), CCDs (21, 22) for receiving interference light beams (L) resulting from interference light produced by superimposing the signal light (S) and the reference light (R) on each other by the half mirror (6) and outputting detection signals, an image forming portion for forming tomographic images based on the detection signals, a measurement depth calculating means (53), and an image processing portion (57). Forming a three-dimensional image or the like based on the arranged tomographic images.

71 Claims, 11 Drawing Sheets

U.S. PATENT DOCUMENTS

| | | | |
|---|---|---|---|
| 6,680,779 B2 * | 1/2004 | Toida | 356/479 |
| 6,735,463 B2 * | 5/2004 | Izatt et al. | 600/476 |
| 7,006,232 B2 * | 2/2006 | Rollins et al. | 356/479 |
| 7,046,371 B2 * | 5/2006 | De Lega et al. | 356/511 |
| 7,126,693 B2 * | 10/2006 | Everett et al. | 356/479 |
| 7,139,079 B2 * | 11/2006 | Lindner | 356/497 |
| 7,245,383 B2 * | 7/2007 | Chan et al. | 356/497 |
| 7,248,371 B2 * | 7/2007 | Chan et al. | 356/497 |
| 7,268,885 B2 * | 9/2007 | Chan et al. | 356/489 |
| 7,307,733 B2 * | 12/2007 | Chan et al. | 356/489 |
| 7,312,876 B2 * | 12/2007 | Chan et al. | 356/497 |
| 7,345,770 B2 * | 3/2008 | Chan et al. | 356/489 |
| 7,355,719 B2 * | 4/2008 | Schluchter | 356/493 |
| 2003/0103212 A1 * | 6/2003 | Westphal et al. | 356/479 |
| 2003/0160965 A1 * | 8/2003 | Lindner | 356/497 |
| 2004/0012791 A1 * | 1/2004 | Lega et al. | 356/497 |
| 2005/0219545 A1 * | 10/2005 | Chan et al. | 356/497 |
| 2006/0028652 A1 * | 2/2006 | Chan et al. | 356/497 |
| 2006/0055939 A1 * | 3/2006 | Akiba et al. | 356/497 |
| 2006/0072118 A1 * | 4/2006 | Chan et al. | 356/495 |
| 2006/0082781 A1 * | 4/2006 | Chan et al. | 356/495 |

OTHER PUBLICATIONS

K.P. Chan, et al; "Micrometre-resolution, optical imaging of objects through highly scattered media using a heterodyne detector array;" *Electronics Letters*; vol. 30; No. 21; Oct. 13, 1994; pp. 1753-1754./Discussed in the specification.

A.F. Fercher, et al.; "Measurement of intraocular distances by backscattering spectral interferometry;" *Optics Communications*; vol. 117; May 15, 1995; pp. 43-48./Discussed in the specification.

* cited by examiner

OPTICAL IMAGE MEASURING APPARATUS AND OPTICAL IMAGE MEASURING METHOD

BACKGROUND OF THE INVENTION

1. Field of the Invention

The present invention relates to an optical image measuring apparatus that applies a light beam to an object to be measured, particularly a light scattering medium, and produces a surface form or inner form of the object to be measured by detecting a reflected light beam or a transmitted light beam. In particular, the present invention relates to an optical image measuring apparatus for measuring the surface form or inner form of the object to be measured by using an optical heterodyne detection method to produce the image of the measured form.

2. Description of the Related Art

In recent years, attention has been given to optical imaging technique that produces an image of a surface or inner portion of an object to be measured using a laser light source or the like. This optical imaging technique is not hazardous to human bodies in contrast to the conventional X-ray CT. Therefore, the development of applications in the medical field has been particularly expected.

An example of a typical method of the optical imaging technique is a low coherent interference method (also called 'optical coherence tomography' or the like). This method uses the low coherence of a broad-band light source having a broad spectral width, such as a super luminescent diode (SLD). According to this method, reflection light from an object to be measured or light transmitted therethrough can be detected at superior distance resolution on the order of μm (for example, see Naohiro Tanno, "Kogaku" (Japanese Journal of Optics), Volume 28, No. 3, 116 (1999)).

FIG. 8 shows a basic structure of a conventional optical image measuring apparatus based on a Michelson interferometer, as an example of an apparatus using the low coherent interference method. An optical image measuring apparatus 200 includes a broad-band light source 201, a mirror 202, a beam splitter 203, and a photo detector 204. An object to be measured 205 is made of a scattering medium. A light beam from the broad-band light source 201 is divided by the beam splitter 203 into two, that is, reference light R propagating to the mirror 202 and signal light S propagating to the object to be measured 205. The reference light R is light reflected by the beam splitter 203. The signal light S is light transmitted through the beam splitter 203.

Here, as shown in FIG. 8, a propagating direction of the signal light S is set as a z-axis direction and a plane orthogonal to the propagating direction of the signal light S is defined as an x-y plane. The mirror 202 is movable in a direction indicated by a double-headed arrow in FIG. 8 (z-scanning direction).

The reference light R is subjected to a Doppler frequency shift through when reflected by the z-scanning mirror 202. On the other hand, the signal light S is reflected from the surface of the object to be measured 205 and from the inner layers thereof when the object to be measured 205 is irradiated with the signal light S. The object to be measured 205 is made of the scattering medium, so reflection light of the signal light S may be a diffusing wave having random phases. The signal light propagating through the object to be measured 205 and the reference light that is reflected by the mirror 202 to be subjected to the frequency shift are superimposed on each other by the beam splitter 203 to produce interference light.

In the image measurement using such a low coherent interference method, interference occurs only when a difference in optical path length between the signal light S and the reference light R is within the coherence length (coherent distance) on the order of μm of the light source. In addition, only the component of the signal light S whose phase is correlated to that of the reference light R interferes with the reference light R. That is, only the coherent signal light component of the signal light S selectively interferes with the reference light R. Based on their principles, the position of the mirror 202 is moved by the z-scanning to vary the optical path length of the reference light R, so that a reflectance profile of the inner layers of the object to be measured 205 is measured. The object to be measured 205 is also scanned with the irradiated signal light S in an x-y plane direction. The interference light is detected by the photo detector 204 during such scanning in the z-direction and the x-y plane direction. An electrical signal (heterodyne signal) outputted as a detection result is analyzed to obtain a two-dimensional sectional image of the object to be measured 205 (see Naohiro Tanno, "Kogaku" (Japanese Journal of Optics), Volume 28, No. 3, 116 (1999)).

Assume that an intensity of the reference light R and an intensity of the signal light S which are superimposed by the beam splitter 203 are given by $I_r$ and $I_s$, respectively, and a frequency difference between the reference light R and the signal light S and a phase difference therebetween are given by $f_{if}$ and $\Delta\theta$, respectively. In this case, a heterodyne signal as expressed by the following expression is outputted from the photo detector (for example, see Yoshizawa and Seta "Optical Heterodyne Technology (revised edition)", New Technology Communications (2003), p. 2).

Expression (1)

$$i(t) \propto I_r + I_s + 2\sqrt{I_r I_s} \cos(2\pi f_{if} t + \Delta\theta) \quad (1)$$

The third term of the right side of the expression (1) indicates an alternating current electrical signal and the frequency $f_{if}$ thereof is equal to the frequency of beat caused from the interference between the reference light R and the signal light S. The frequency $f_{if}$ of an alternating current component of the heterodyne signal is called a beat frequency or the like. The first and second terms of the right side of the expression (1) indicate the direct current components of the heterodyne signal and correspond to a signal intensity of background light of interference light.

However, when the two-dimensional cross sectional image is obtained by the conventional low coherent interference method, it is necessary to scan the object to be measured 205 with a light beam and to successively detect reflection light waves from respective regions of the object to be measured 205 in a depth direction (z-direction) and a sectional direction (x-y plane direction). Therefore, the measurement of the object to be measured 205 requires a long time. In addition, it is hard to shorten a measurement time in view of measurement fundamentals.

In views of such problems, an optical image measuring apparatus for shortening a measurement time has been proposed. FIG. 9 shows a fundamental structure of an example of such an apparatus. As shown in FIG. 9, an optical image measuring apparatus 300 includes a broad-band light source 301, a mirror 302, a beam splitter 303, a two-dimensional photo sensor array 304 serving as a photo detector, and lenses 306 and 307. A light beam emitted from the light source 301 is converted into a parallel light flux by the lenses 306 and 307 and a beam diameter thereof is widened thereby. Then, the parallel light flux is divided into two, that is, the reference light R and the signal light S by the beam splitter 303. The reference light R is subjected to Doppler frequency shift through z-scanning with the mirror 302. On the other hand, the signal light S is incident on the object to be measured 305 over a broad area of the x-y plane because the beam diameter is widened. Therefore, the signal light S becomes reflection light including information related to the surface and inner portion of the object to be measured 305 over a wide area. The reference light R and the signal light S are superimposed on each other by the beam splitter 303 and detected by elements (photo sensors) arranged in parallel on the two-dimensional photo sensor array 304. Thus, it is possible to obtain a two-dimensional cross sectional image of the object to be measured 305 in real time without light beam scanning.

An apparatus described in K. P. Chan, M. Yamada, and H. Inaba, "Electronics Letters", Vol. 30, 1753 (1994) has been known as such a non-scanning type optical image measuring apparatus. In the apparatus described in the same document, a plurality of heterodyne signals outputted from a two-dimensional photo sensor array are inputted to signal processing systems arranged in parallel to detect the amplitude and phase of each of the heterodyne signals.

However, when the spatial resolution of an image is increased, it is necessary to increase a number of elements of the array. In addition, it is necessary to prepare a signal processing system including a number of channels corresponding to the number of elements. Therefore, it is supposedly hard to actually use the apparatus in fields that require a high resolution image, such as a medical field and an industrial field.

Thus, the inventors of the present invention have proposed the following non-scanning type optical image measuring apparatus in JP 2001-330558 A (claims and specification paragraphs [0044] and [0072] to [0077]). The optical image measuring apparatus according to this proposal includes a light source for emitting a light beam, an interference optical system, and a signal processing portion. In the interference optical system, the light beam emitted from the light source is divided into two, that is, signal light propagating through an examined object arrangement position in which an object to be examined is arranged and reference light propagating on an optical path different from an optical path passing through the examined object arrangement position. The signal light propagating through the examined object arrangement position and the reference light propagating on the different optical path are superimposed on each other to produce interference light. The interference optical system includes a frequency shifter, light cutoff devices, and photo sensors. The frequency shifter shifts a frequency of the signal light and a frequency of the reference light relative to each other. In order to receive the interference light in the interference optical system, the interference light is divided into two parts. The light cutoff devices periodically cut off the two divided parts of the interference light to generate two interference light pulse trains with a phase difference of 90 degrees therebetween. The photo sensors respectively receive the two interference light pulse trains. The photo sensors each have a plurality of light receiving elements which are spatially arranged and separately detect light receiving signals. The signal processing portion combines the plurality of light receiving signals detected by the photo sensors to generate signals of the signal light which correspond to respective points of interest of a surface or inner layers of the object to be examined which is arranged in the examined object arrangement position on a propagating path of the signal light.

In the optical image measuring apparatus, the interference light in which the reference light and the signal light interfere with each other is divided into two parts. The two parts of the interference light are received by the two photo sensors (two-dimensional photo sensor arrays) and respectively sampled by the light cutoff devices (shutters) disposed in front of both sensor arrays. A phase difference of $\pi/2$ is set between sampling periods of the two divided parts of the interference light. Therefore, an intensity of the signal light and an intensity of the reference light which compose background light of the interference light and phase quadrature components (sine component and cosine component) of the interference light are detected. In addition, an intensity of the background light included in outputs from both the sensor arrays is subtracted from the outputs of both the sensor arrays to calculate two phase quadrature components of the interference light. An amplitude of the interference light is obtained based on the calculation result.

An available image sensor such as a charge-coupled device (CCD) camera has been widely used for the two-dimensional photo sensor array of the optical image measuring apparatus as described above. However, up to now, a problem has been recognized that a currently available CCD camera cannot follow the beat frequency of a heterodyne signal which is the order of several kHz to several MHz because of the low frequency response characteristic thereof. The feature of the optical image measuring apparatus which is proposed by the inventors of the present invention and described in JP 2001-330558 A (claims, specification paragraphs [0068] to [0084], and FIG. 1) is to perform the measurement using the low frequency response characteristic based on the sufficient recognition of the problem.

In the optical image measuring apparatus described in JP 2001-330558 A (claims, specification paragraphs [0068] to [0084], and FIG. 1), the acquisition of one frame of an x-y tomographic image takes a time of about one millisecond. In order to form a three-dimensional image of the object to be measured, a tomographic image thereof (x-z tomographic image or y-z tomographic image) in a measurement depth direction, or a tomographic image thereof in a direction oblique to an axis, it is necessary to acquire x-y tomographic images at many measurement depths (z-coordinates). In order to acquire, for example, the three-dimensional image of the object to be measured with suitable precision, it is necessary to perform scanning in a measurement depth direction (z-direction) at a predetermined interval of, for example, about 5 micrometers. For example, the three-dimensional image of the object to be measured is formed on the assumption that the respective x-y tomographic images are measured at the predetermined interval.

The formation of the three-dimensional image or the like takes a time of one or more seconds depending on, for example, a type of object to be measured. However, when a movable object to be measured, such as a human eye which is a living tissue moves during the measurement of the object to be measured, it is likely to cause the displacement of the measurement position related to each of the x-y tomographic images to reduce the precision of the three-dimensional image or the like.

In particular, when the measurement interval for the x-y tomographic images in the measurement depth direction is displaced, the above-mentioned assumption related to the formation of the three-dimensional image or the like is not satisfied, so the precision of the image significantly reduces. Therefore, profile of some kind for associating the x-y tomographic images in the measurement depth direction (z-direction) with one another is required.

With respect to a method of acquiring the information of the object to be measured in the z-direction, there has been known, for example, an optical measurement apparatus as shown in FIG. 10 (for example, see A. F. Fercher, C. K.

Hitzenberger, G. Kamp, and S. Y. Elzaiat, "Optics Communication", Vol. 117, pp. 43-48 (1995)). In an optical measurement apparatus 400 shown in FIG. 10, a light beam from a broad-band light source 401 is divided by a half mirror 402 into signal light propagating to an object to be measured 404 and reference light propagating to a mirror (fixed mirror) 403 which is fixedly disposed. The signal light reflected on the object to be measured 404 and the reference light reflected on the fixed mirror 403 are superimposed on each other to produce interference light. The interference light is separated into wavelength components having wavelengths λ1 to λn by a diffraction grating 405. The respective wavelength components are detected by a one-dimensional photo sensor array 406. Each of photo sensors composing the one-dimensional photo sensor array 406 outputs a detection signal indicating a light intensity of each of the detected wavelength components to a computer 407.

The computer 407 acquires a relationship between a wavelength and a light intensity of the interference light, that is, an light intensity distribution (wavelength spectrum) of the interference light, based on the detection signals of the respective wavelength components of the interference light which are outputted from the one-dimensional photo sensor array 406. FIG. 11A is a schematic graph showing an example of the wavelength spectrum of the interference light.

Then, the computer 407 performs Fourier transform on the acquired wavelength spectrum of the interference light. As a result, as shown in FIG. 11B, an interference signal intensity distribution based on the z-coordinate (measurement depth) of the object to be measured 404 as a variable is acquired. This is information depending on the measurement depth of the object to be measured 400. The one-dimensional photo sensor array 406 normally has a readout rate of 1 MHz or more (that is, 1μ seconds or less). Therefore, the interference signal intensity distribution based on the measurement depth as a variable can be acquired at the same rate.

SUMMARY OF THE INVENTION

The present invention has been made in view of the above-mentioned circumstances. An object of the present invention is to provide an optical image measuring apparatus capable of forming a three-dimensional image or the like with high precision based on x-y tomographic images of an object to be measured, which are acquired at various depth (z-coordinate) regions, even when the object to be measured moves or propagates during measurement, and an optical image measuring method for the optical image measuring apparatus.

In order to attain the above-described object, an optical image measuring apparatus according to a first aspect of the present invention, including: dividing means for dividing a light beam outputted from a low-coherent light source into signal light propagating to an object to be measured and reference light propagating to a reference object, frequency shifting means for shifting a frequency of the signal light and a frequency of the reference light relative to each other, changing means for changing optical path length of the reference light, superimposing means for superimposing the signal light propagating through the object to be measured and the reference light propagating through the reference object on each other to produce interference light including a beat frequency based on an amount of the frequency shift, detecting means for outputting a detection signal based on the produced interference light, and image forming means for forming a tomographic image of the object to be measured which is orthogonal to a propagating direction of the signal light based on the outputted detection signal, is characterized by including acquiring means for acquiring measurement depths in the propagating direction of the signal light which are related to the formed tomographic images of the object to be measured.

According to a second aspect of the present invention, an optical image measuring apparatus according to the first aspect of the invention, further includes image processing means for arranging a plurality of tomographic images acquired by a change in optical path length of the reference light which is caused by the changing means in a measurement depth direction based on measurement depths related to the plurality of tomographic images which are acquired by the acquiring means.

According to a third aspect of the present invention, there is provided an optical image measuring apparatus according to the first or second aspect of the invention, in which the acquiring means includes: an auxiliary light source for outputting an auxiliary light beam which is low-coherent light; auxiliary division means for dividing the outputted auxiliary light beam into auxiliary signal light propagating through the object to be measured and auxiliary reference light propagating through an auxiliary reference object which is fixedly disposed; auxiliary superimposition means for superimposing the auxiliary signal light propagating through the object to be measured and the auxiliary reference light propagating through the auxiliary reference object on each other to produce auxiliary interference light; wavelength component separating means for separating a plurality of wavelength components from the produced auxiliary interference light; auxiliary detection means for receiving the plurality of separated wavelength components and outputting an auxiliary detection signal; and measurement depth calculating means for calculating the measurement depth related to the tomographic image based on the detected auxiliary detection signal.

According to a fourth aspect of the present invention, there is provided an optical image measuring apparatus according to the third aspect of the invention, in which the acquiring means further includes combining and separating means for combining the auxiliary signal light separated by the auxiliary division means with the signal light to allow the signal light with which the auxiliary signal light is combined to enter the object to be measured and separating the auxiliary signal light from the signal light propagating through the object to be measured to guide the auxiliary signal light to the auxiliary superimposition means.

According to a fifth aspect of the present invention, there is provided an optical image measuring apparatus according to the fourth aspect of the invention, in which the acquiring means further includes scanning means for performing scanning with the auxiliary signal light combined with the signal light by the combining and separating means in a direction orthogonal to a propagating direction of the signal light, and the measurement depth calculating means calculates the measurement depth based on a plurality of auxiliary detection signals outputted from the auxiliary detection means in accordance with the scanning with the auxiliary signal light which is performed by the scanning means.

According to a sixth aspect of the present invention, there is provided an optical image measuring apparatus according to the fifth aspect of the invention, in which the scanning means performs the scanning with the auxiliary signal light in a plurality of positions each time when the optical path length of the reference light is changed by the changing means and the measurement depth calculating means calculates a plurality of measurement depths each corresponding to each of the plurality of positions based on auxiliary detection signals detected in accordance with the auxiliary signal light for the scanning in the plurality of positions and calculates the measurement depth related to the tomographic image based on the plurality of calculated measurement depths.

According to a seventh aspect of the present invention, there is provided an optical image measuring apparatus according to the fifth or sixth aspect of the invention, in which the scanning means includes a galvanometer mirror including a reflecting mirror for reflecting the auxiliary signal light and a driver portion for changing an orientation of a reflective surface of the reflecting mirror.

According to an eighth aspect of the present invention, there is provided an optical image measuring apparatus according to any one of the fourth to seventh aspects of the invention, in which the combining and separating means includes one of a wavelength filter and a beam splitter which is tilted relative to an optical path of the signal light.

According to a ninth aspect of the present invention, there is provided an optical image measuring apparatus according to the first or second aspect of the invention, in which the acquiring means includes: interference light separating means for separating a part of the interference light produced by the superimposing means as auxiliary interference light from the interference light; wavelength component acquiring means for separating a plurality of wavelength components from the auxiliary interference light separated by the interference light separating means; auxiliary detection means for receiving the plurality of separated wavelength components and outputting an auxiliary detection signal; and measurement depth calculating means for calculating the measurement depth related to the tomographic image based on the detected auxiliary detection signal.

According to a tenth aspect of the present invention, there is provided an optical image measuring apparatus according to the ninth aspect of the invention, in which the interference light separating means includes a beam splitter tilted relative to an optical path of the interference light produced by the superimposing means.

According to an eleventh aspect of the present invention, there is provided an optical image measuring apparatus according to any one of the third to tenth aspects of the invention, in which wavelength component acquiring means includes a diffraction grating.

According to a twelfth aspect of the present invention, there is provided an optical image measuring apparatus according to any one of the third to eleventh aspects of the invention, in which the auxiliary detection means includes a one-dimensional photo sensor array.

According to a thirteenth aspect of the present invention, there is provided an optical image measuring apparatus according to any one of the third to twelfth aspects of the invention, in which the measurement depth calculating means includes: wavelength spectrum acquiring means for acquiring a wavelength spectrum of the auxiliary interference light based on the auxiliary detection signal; and measurement depth information acquiring means for performing Fourier transform on the acquired wavelength spectrum to acquire measurement depth information indicating an intensity distribution of the auxiliary interference light based on the measurement depth, and the measurement depth calculating means calculates the measurement depth related to the tomographic image formed by the image forming means based on the measurement depth information acquired related to tomographic image.

According to a fourteenth aspect of the present invention, there is provided an optical image measuring apparatus according to the thirteenth aspect of the invention, in which the measurement depth calculating means compares measurement depth information acquired by the measurement depth information acquiring means in relation to two tomographic images successively formed by the image forming means with each other and calculates a measurement interval between the two tomographic images to acquire a measurement depth.

According to a fifteenth aspect of the present invention, there is provided an optical image measuring method of dividing a light beam outputted from a low-coherent light source into signal light propagating to an object to be measured and reference light propagating to a reference object, shifting a frequency of the signal light and a frequency of the reference light relative to each other, superimposing the signal light propagating through the object to be measured and the reference light propagating through the reference object on each other to produce interference light including a beat frequency based on an amount of frequency shift, outputting a detection signal based on the produced interference light, and forming a tomographic image of the object to be measured which is orthogonal to a propagating direction of the signal light based on the outputted detection signal, which includes the steps of: forming a plurality of tomographic images based on a change in optical path length of the reference light; acquiring measurement depths in the propagating direction of the signal light which are related to the formed tomographic images of the object to be measured; and arranging the plurality of tomographic images in a measurement depth direction based on the acquired measurement depths related to each of the plurality of tomographic images.

According to a sixteenth aspect of the present invention, there is provided an optical image measuring method according to the fifteenth aspect of the invention, in which the measurement depth acquiring step includes the steps of: outputting an auxiliary light beam which is low-coherent light; dividing the outputted auxiliary light beam into auxiliary signal light propagating through the object to be measured together with the signal light and auxiliary reference light propagating through an auxiliary reference object which is fixedly disposed; superimposing the auxiliary signal light propagating through the object to be measured and the auxiliary reference light propagating through the auxiliary reference object on each other to produce auxiliary interference light; separating a plurality of wavelength components from the produced auxiliary interference light; receiving the plurality of separated wavelength components and outputting an auxiliary detection signal; and calculating the measurement depth related to the tomographic image based on the outputted auxiliary detection signal.

According to a seventeenth aspect of the present invention, there is provided an optical image measuring method according to the sixteenth aspect of the invention, in which the measurement depth acquiring step further includes the step of performing scanning with the auxiliary signal light in a direction orthogonal to a propagating direction of the signal light, and in the measurement depth acquiring step, the measurement depth is calculated based on a plurality of auxiliary detection signals outputted in accordance with the scanning with the auxiliary signal light.

According to an eighteenth aspect of the present invention, there is provided an optical image measuring method according to the fifteenth aspect of the invention, in which the measurement depth acquiring step includes the steps of: separating a part of the produced interference light as auxiliary interference light from the interference light; separating a plurality of wavelength components from the separated auxiliary interference light; receiving the plurality of separated wavelength components and outputting an auxiliary detection signal; and calculating the measurement depth related to the tomographic image based on the outputted auxiliary detection signal.

According to a nineteenth aspect of the present invention, there is provided an optical image measuring method according to any one of the sixteenth to eighteenth aspects of the invention, in which the measurement depth acquiring step includes the steps of: acquiring a wavelength spectrum of the auxiliary interference light based on the auxiliary detection signal; and performing Fourier transform on the acquired wavelength spectrum to acquire measurement depth information indicating an intensity distribution of the auxiliary interference light based on the measurement depth, and the measurement depth related to the formed tomographic image is calculated based on the measurement depth information acquired related to the tomographic image.

According to the present invention, it is possible to acquire the measurement depths related to the tomographic images of the object to be measured in the propagating direction of the signal light. Therefore, even when the object to be measured moves or propagates during measurement, a three-dimensional image or the like can be formed with high precision based on the acquired measurement depths.

In particular, according to the second aspect of the present invention, the plurality of tomographic images acquired based on a change in optical path length of the reference light are arranged in the measurement depth direction based on the measurement depths acquired related to the plurality of tomographic images. Therefore, the three-dimensional image or the like can be easily acquired with high precision.

According to the fifth or seventeenth aspect of the present invention, scanning with the auxiliary signal light is performed in the direction orthogonal to the propagating direction of the signal light and the measurement depths are calculated based on the plurality of auxiliary detection signals in accordance with the scanning with the auxiliary signal light. Therefore, the three-dimensional image or the like can be formed with higher precision.

BRIEF DESCRIPTION OF THE DRAWINGS

In the accompanying drawings:

FIGS. 6A to 6E are explanatory graphs showing interference light detection modes of the optical image measuring apparatus according to the present invention, in which FIG. 6A illustrates a temporal waveform of a light beam whose frequency is intensity-modulated to be outputted from a broad-band light source, FIG. 6B illustrates a temporal waveform of an S-polarized light component of interference light in the case where the laser beam outputted from the broad-band light source is continuous light, FIG. 6C illustrates a temporal waveform of a P-polarized light component of the interference light in the case where the laser beam outputted from the broad-band light source is the continuous light, FIG. 6D illustrates a temporal waveform of the S-polarized light component of the interference light in the case where the intensity of the laser beam outputted from the broad-band light source is modulated, and FIG. 6E illustrates a temporal waveform of the P-polarized light component of the interference light in the case where laser beam outputted from the broad-band light source is intensity-modulated;

FIGS. 11A and 11B are schematic graphs showing a pattern of information acquired by the conventional optical image measuring apparatus, in which FIG. 11A is a schematic graph showing an example of a wavelength spectrum of interference light and FIG. 11B is a schematic graph showing an example of an intensity distribution of an interference signal based on a z-coordinate (measurement depth) of an object to be measured as a variable.

DETAILED DESCRIPTION OF THE PREFERRED EMBODIMENTS

Examples of an optical image measuring apparatus and an optical image measuring method according to each of preferred embodiments of the present invention will be described in detail with reference to the accompanying drawings.

First Embodiment

[Structure of Apparatus]

Figure 1:
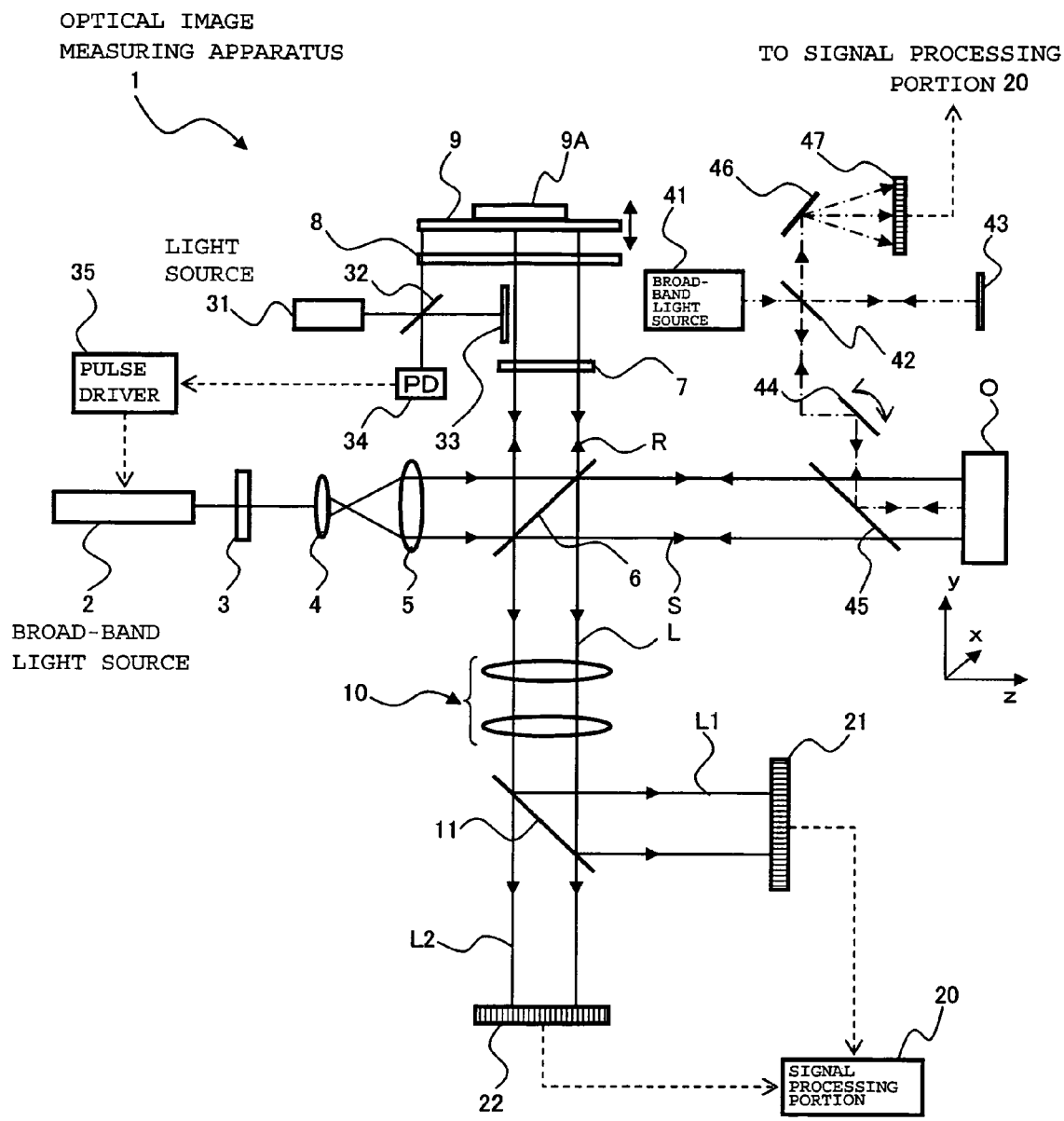
FIG. 1 is a schematic diagram showing a structural example of an optical image measuring apparatus according to a first embodiment of the present invention.
Figure 2:
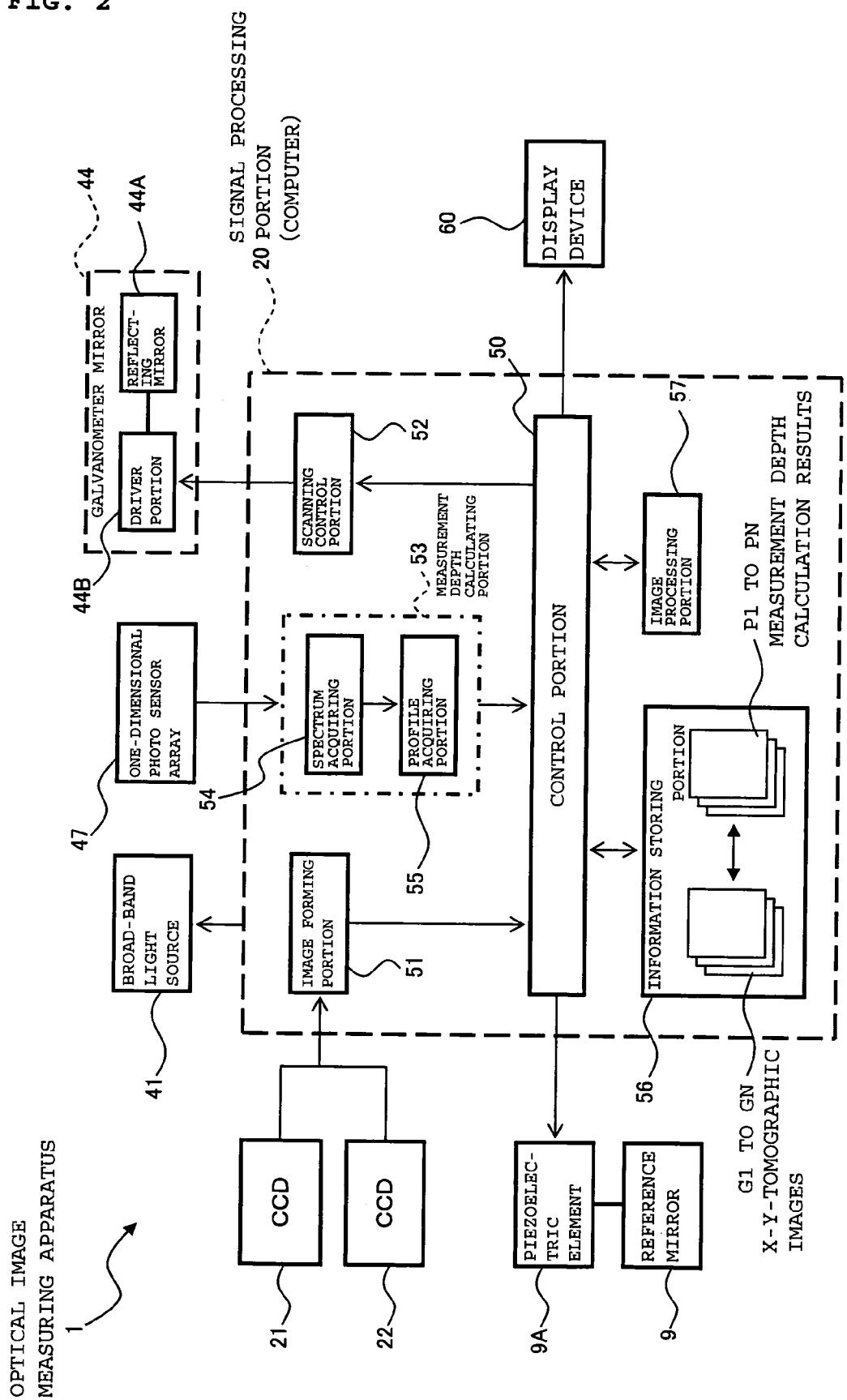
FIG. 2 is a schematic diagram showing a structural example of the optical image measuring apparatus according to the first embodiment of the present invention.

An optical image measuring apparatus according to the first embodiment of the present invention will be described with reference to FIGS. 1 and 2. FIG. 1 illustrates a schematic structure of an optical system of the optical image measuring apparatus according to this embodiment and FIG. 2 illustrates a structure of a control system thereof. The optical image measuring apparatus according to this embodiment is an apparatus used to form a tomographic image and a surface image of an object to be measured and a three-dimensional image thereof, for example, in the medical field and the industrial field. The object to be measured is an object which is made of a scattering medium such as a human eye, for example, in the medical field.

[Structure of Optical System]

First, referring to FIG. 1 the structure of the optical image measuring apparatus according to the embodiment is explained. The optical image measuring apparatus 1 includes a broad-band light source 2 for outputting a low-coherent light beam, a polarizing plate 3 for converting a polarization characteristic of the light beam to linear polarization, lenses 4 and 5 for converting the light beam to a parallel light flux and increasing a beam diameter thereof, and a half mirror 6 for dividing the light beam into signal light S and reference light R and also superimposing the signal light S and the reference light R on each other to produce interference light L. The optical image measuring apparatus 1 further includes a wavelength plate 7 for converting a polarization characteristic of the reference light R from linear polarization to circular polarization, a frequency shifter 8 for shifting a frequency of the reference light R, a reference mirror 9 for totally reflecting the reference light R on a reflective surface orthogonal to a propagating direction of the reference light R, and a piezoelectric element 9A provided on a rear surface opposite to the reflective surface of the reference mirror 9. Note that the interference light L produced by the half mirror 6 corresponds to the "first interference light" in the present invention.

The broad-band light source 2 corresponds to a "low-coherent light source" in the present invention and is composed of an SLD, a light-emitting diode (LED), or the like. A coherent length of an available near-infrared region SLD is about 30 μm and a coherent length of an LED is about 10 μm.

In an xyz-coordinate system shown in FIG. 1, a propagating direction of the light beam outputted from the broad-band light source 2 is defined as a z-direction and an oscillation plane of the light beam orthogonal to the propagating direction thereof is defined as an x-y plane. The x-direction and a y-direction are defined so as to align with an oscillation plate of an electric field component of the light beam and an oscillation plate of a magnetic field component thereof, respectively. The z-direction is defined as a propagating direction of the signal lights propagating to an object to be measured O, and also as a measurement depth direction of the object to be measured O.

The polarizing plate 3 corresponds to the "first converting means" in the present invention and is a polarization conversion element for transmitting an oscillation component of the light beam in a predetermined direction, which is outputted from the broad-band light source 2. In this embodiment, the polarizing plate 3 is constructed to transmit an oscillation component in an angle direction by 45° with respect to an x-axis (and a y-axis) of the xy-plane. The light beam passing through the polarizing plate 3 has linearly polarized light by 45°. Therefore, the amplitudes of polarization components of the light beam in the x-axis direction and the y-axis direction are equal to each other. In other words, the amplitude of a P-polarized light component of the light beam is equal to that of a S-polarized light component thereof.

The half mirror 6 composes the "dividing means" in present invention, for dividing the linearly polarized, parallel beam into the signal light S propagating to the object to be measured O and the reference light R propagating to the reference mirror 9. The half mirror 6 transmits a part (half) of the light beam as the signal light S and reflects the rest thereof as the reference light R.

The half mirror 6 composes the "superimposing means" in the present invention, for reflecting a part of the signal light S propagating through the object to be measured O, transmitting a part of the reference light R propagating through the reference mirror 9 to superimpose the signal light S and the reference light R, thereby producing the interference light L. An optical element which is tilted relative to an optical path of the signal light S and indicated by reference numeral 45 is a wavelength filter 45 having a characteristic for transmitting the signal light S (described in detail later).

In this embodiment, because a Michelson interferometer is used, the dividing means and the superimposing means each are composed of (different reflective surface of) the same half mirror 6. On the other hand, when another type of interferometer such as a Mach-Zehnder interferometer is employed, an optical element composing the dividing means may be different from that composing the superimposing means. An arbitrary non-polarization beam splitter having no influence on the polarization characteristics of the light beams (signal light S and reference light R) is preferably applied to each of the dividing means and the superimposing means.

The wavelength plate 7 is a polarization conversion element for converting the polarization characteristic of the reference light R from linear polarization to circular polarization. In this embodiment, a ⅛-wavelength plate is used as the wavelength plate 7. Therefore, when the reference light R passes through the wavelength plate 7, a phase difference of π/4 is provided between a P-polarized light component of the reference light R and an S-polarized light component thereof. In each of the case where the reference light R propagates from the half mirror 6 to the reference mirror 9 and the case where the reference light R is reflected on the reference mirror 9 and incident on the half mirror 6 again, the above-mentioned phase difference is applied to the reference light R. As a result, a phase difference of π/2 is applied to the reference light R. Thus, the wavelength plate 7 acts on the reference light R having linearly polarized light of 45° in the same manner as the ¼-wavelength plate, so the reference light R which is incident on the half mirror 6 again is converted to circularly polarized light. When another interferometer such as the Mach-Zehnder interferometer is used as described above, it is possible to apply the ¼-wavelength plate.

The frequency shifter 8 composes "frequency shifting means" in the present invention and shifts a frequency of the reference light R before and after it is reflected on the reference mirror 9. The frequency shifter 8 is composed of, for example, an optoelectronic modulator or an acousto-optic modulator. Note that as described below, it is also possible to remove the frequency shifter 8 from the optical image measuring apparatus according to the present invention. In such a case, the frequency of the reference light R is shifted by moving the reference mirror 9. The frequency shifter 8 in this embodiment is disposed on an optical path of the reference light R. The frequency shifter 8 may also be disposed on the optical path of the signal light S. That is, the frequency shifter is used to produce the beat of the interference light L, so it is only necessary that a relative frequency difference can be provided between the signal light S and the reference light R.

The reference mirror 9 composes a "reference object" in the present invention and is moved in an optical path direction of the reference light R to extract reflection light of the signal light S at each depth (z-coordinate) of the object to be measured O. More specifically, because the light beam from the broad-band light source 2 is the low-coherent light, only the signal light S propagating a distance substantially equal to a propagating distance of the reference light R is useful to produce the interference light L. In other words, only reflection light on the object to be measured O at a z-coordinate which is located at a distance substantially equal to a distance to the reference mirror 9 relative to the half mirror 6 interferes with the reference light R to produce the interference light L. Therefore, the position of the reference mirror 9 is changed (z-scanning is performed) to continuously extract reflection light on a region of the object to be measured at O at each z-coordinate.

The reference mirror 9 is continuously moved in the optical path direction of the reference light R by the piezoelectric element 9A so as to act to shift the frequency of the reference light R. Frequency shift applied by the movement of the reference mirror 9 is called Doppler frequency shift in some cases. In this time, the piezoelectric element 9A composes "driving means" in the present invention. The reference mirror 9 and the piezoelectric element 9A compose "frequency shifting means" in the present invention. Although will be described in detail in a second embodiment, it is possible to employ a structure in which the reference mirror 9 and the piezoelectric element 9A are not used for frequency shift.

A structure for applying frequency shift using only the frequency shifter 8 can be employed without using the reference mirror 9 and the piezoelectric element 9A for frequency shift. A structure for applying frequency shift using the reference mirror 9 and the piezoelectric element 9A can be also employed without providing the frequency shifter 8.

The optical image measuring apparatus 1 according to this embodiment further includes an imaging lens group 10 for imaging the interference light L produced by the half mirror 6 serving as the superimposing means, a polarization beam splitter 11 for separating a plurality of different polarized light components from the interference light L, CCDs (cameras) 21 and 22 provided on optical paths of the separated respective polarized light components of the interference light L, and a signal processing portion 20 for processing respective results obtained by detection with the CCD 21 and 22.

The polarization beam splitter 11 acts to separate a plurality of different polarized light components from the interference light L. More specifically, the polarization beam splitter 11 acts to reflect the S-polarized light component L1 of the interference light L to allow the CCD 21 to receive the reflected S-polarized light component L1 and to transmit the P-polarized light component L2 thereof to allow the CCD 22 to receive the transmitted P-polarized light component L2. The amplitude (that is, maximum intensity) of the S-polarized light component L1 of the interference light L is equal to that of the P-polarized light component L2 thereof.

The CCDs 21 and 22 compose "detecting means" in the present invention and each are a storage type two-dimensional photo sensor array for interference light detection. The CCD 21 receives the S-polarized light component L1 of the interference light L which is reflected on the polarization beam splitter 11, performs its photoelectric conversion to generate a detection signal, and outputs the detection signal to the signal processing portion 20. Similarly, the CCD 22 receives the P-polarized light component L2 of the interference light L which passes through the polarization beam splitter 11, performs its photoelectric conversion to generate a detection signal, and outputs the detection signal to the signal processing portion 20. Each of the detection signals outputted from the CCDs 21 and 22 is the heterodyne signal.

The signal processing portion 20 performs calculation processing described later based on the detection signals outputted from the CCDs 21 and 22. Then, the signal processing portion 20 analyzes a result obtained by the calculation processing to form a two-dimensional tomographic image of the object to be measured O. The two-dimensional tomographic image formed by the signal processing portion 20 is an x-y tomographic image of the object to be measured O at a depth (z-coordinate) region in which a length of the optical path of the signal light S is substantially equal to that of the optical path of the reference light R. Therefore, according to the optical image measuring apparatus 1, it is possible to acquire the x-y tomographic image of the object to be measured O at an arbitrary depth region by one-time measurement (that is, without performing a scan in x-y directions).

As will be described in detail later, the signal processing portion 20 forms various images such as a three-dimensional image of the object to be measured O, a tomographic image thereof (x-z tomographic image or y-z tomographic image) in the measurement depth direction, and a tomographic image thereof in a direction oblique to an axis based on the x-y tomographic images acquired various depths. The images formed by the signal processing portion 20 are displayed on a display device such as a monitor device (not shown)

The signal processing portion 20 executing the above-mentioned processings is composed of, for example, a computer which includes a storage device for storing a predetermined calculation program, such as a ROM or a hard disk drive and a calculation control device executing the calculation program, such as a CPU. The structure and the operation of the signal processing portion 20 will be described in detail later.

The optical image measuring apparatus 1 of this embodiment further includes a light source 31, a beam splitter 32, a reflecting mirror 33, a photo detector (PD) 34, and a pulse driver 35, which compose a structure for monitoring the amount of frequency shift applied to the reference light R and periodically modulating the light beam from the broad-band light source 2.

The light source 31 corresponds to a "laser light source" in the present invention and is composed of, for example, a laser diode for emitting laser light having a coherent length longer than that of the light beam from the broad-band light source 2. The beam splitter 32 divides the laser light from the light source 31 into first laser light (reflection light) propagating through the frequency shifter 8 and the reference mirror 9 and second laser light (transmission light) propagating through the reflecting mirror (fixed mirror) 33 disposed to be fixed. Then, the beam splitter 32 superimposes the first laser light which has been subjected to frequency shift by the frequency shifter 8 or the like and the second laser light reflected on the reflecting mirror 33 on each other to produce interference light. The beam splitter 32, the reflecting mirror 33, and the reference mirror 9 compose an "interference optical system" in the present invention. The interference light produced by the interference optical system corresponds to "second interference light".

The photo detector 34 detects the interference light produced by the beam splitter 32 and outputs an electrical signal having a frequency equal to that of the interference light. The pulse driver 35 generates a pulse signal having a frequency synchronized with (for example, frequency equal to) that of the electrical signal outputted from the photo detector 34 and outputs the pulse signal to the broad-band light source 2.

The broad-band light source 2 is driven with the pulse signal outputted from the pulse driver 35 and outputs a pulsed light beam having a repetition frequency equal to that of the pulse signal. At this time, the light beam from the broad-band light source 2 is outputted as, for example, pulsed light of a rectangular train with a duty of 50%.

The optical image measuring apparatus 1 further includes a broad-band light source 41, a half mirror 42, a fixed mirror 43, a galvanometer mirror 44, a wavelength filter 45, a diffraction grating 46, and a one-dimensional photo sensor array 47 in order to produce a measurement depth profile used to acquire measurement depths (z-coordinates) of a plurality of x-y tomographic images of the object to be measured O. Although it will be described in detail later, the measurement depth profile corresponds to "measurement depth information" in the present invention.

The broad-band light source 41 is an "auxiliary light source" in the present invention, for outputting a light beam having a wavelength different from that of the broad-band light source 2 for measurement (referred to as an "auxiliary light beam"). A part of the auxiliary light beam outputted from the broad-band light source 41 (referred to as "auxiliary signal light") is reflected on the half mirror 42 which acts as "auxiliary division means" in the present invention and propagates to the galvanometer mirror 44. A remaining part of the auxiliary light beam (referred to as "auxiliary reference light") passes through the half mirror 42 and propagates to the fixed mirror 43.

The galvanometer mirror 44 composes "scanning means" in the present invention and includes a reflecting mirror and a driver portion for driving the reflecting mirror to change the orientation of a reflective surface thereof (see FIG. 2). The wavelength filter 45 has a characteristic for transmitting the light beam from the broad-band light source 2 (thus the signal light S) and reflecting the auxiliary light beam from the broad-band light source 41 (thus the auxiliary signal light).

Therefore, the auxiliary signal light which is reflection light on the half mirror 42 is reflected on the galvanometer mirror 44 and then reflected on the wavelength filter 45. The object to be measured O is irradiated with the auxiliary signal light in addition to the signal light S. The auxiliary signal light and the signal light S with which the object to be measured O is irradiated are reflected on various depth (z-coordinate) regions and exited from the object to be measured O. Then, the auxiliary signal light is separated from the signal light S by the wavelength filter 45, reflected on the galvanometer mirror 44, and incident on the half mirror 42. The wavelength filter 45 composes "combining and separating means" in the present invention.

The auxiliary signal light which propagates through the object to be measured O and is incident on the half mirror 42 is superimposed on the auxiliary reference light reflected on the fixed mirror 43 to produce interference light (referred to as auxiliary interference light). The half mirror 42 composes "auxiliary superimposition means" in the present invention.

The auxiliary interference light is separated into respective wavelength components by the diffraction grating 46. The respective wavelength components are detected by the one-dimensional photo sensor array 47. Each of photo sensors composing the one-dimensional photo sensor array 47 outputs a detection signal indicating a light intensity of each of the detected wavelength components (referred to as an auxiliary detection signal) to the signal processing portion 20. The diffraction grating 46 composes "wavelength component separating means" in the present invention. The one-dimensional photo sensor array 47 composes "auxiliary detection means" in the present invention.

Figure 11A:
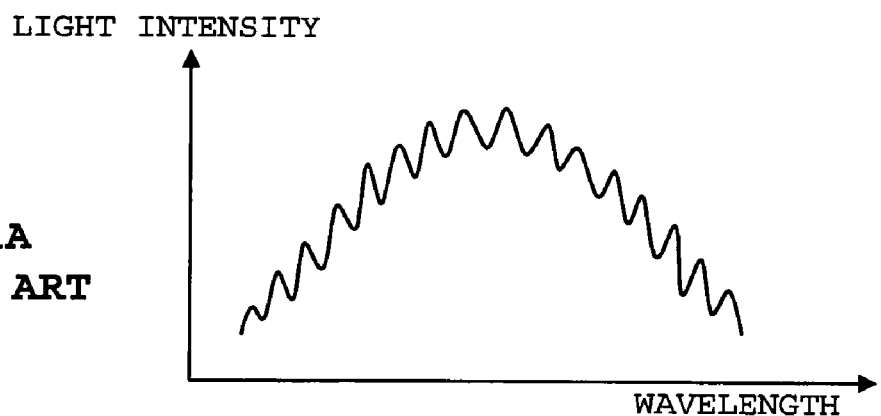

The signal processing portion 20 acquires a relationship between a wavelength and a light intensity of the auxiliary interference light, that is, an light intensity distribution (wavelength spectrum) of the auxiliary interference light based on the detection signals corresponding to the respective wavelength components outputted from the one-dimensional photo sensor array 47 (see FIG. 11A).

Figure 11B:
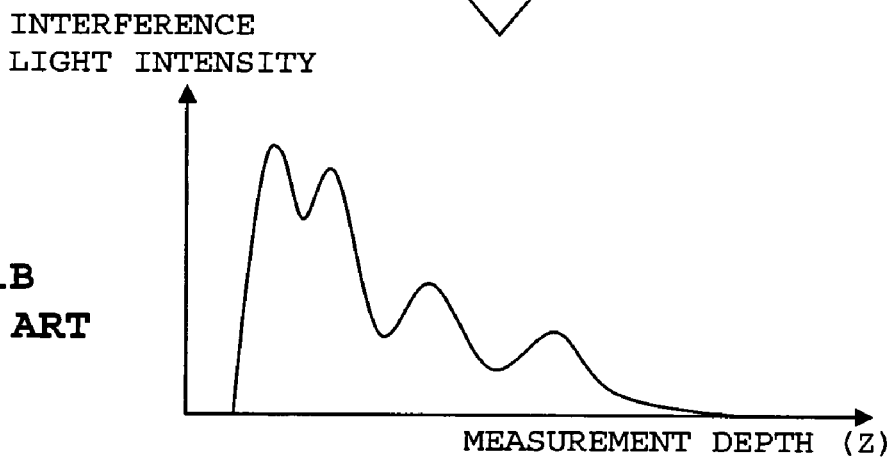

Then, the signal processing portion 20 performs Fourier transform on the acquired wavelength spectrum of the auxiliary interference light to acquire an intensity distribution of the auxiliary interference light based on the z-coordinate (measurement depth) of the object to be measured O as a variable (see FIG. 11B). The intensity distribution corresponds to the measurement depth profile (measurement depth information). The measurement depths related to the respective x-y tomographic images are calculated based on the intensity distribution. Such measurement depth acquiring processing is executed at a rate of 1 MHz or more, that is, for a time of 1μ seconds or less.

During the measurement while scanning with the auxiliary signal light is performed by the galvanometer mirror 44, a plurality of auxiliary detection signals corresponding to a plurality of scanning positions related to the respective x-y tomographic images are inputted to the signal processing portion 20. The signal processing portion 20 calculates the measurement depths related to the corresponding x-y tomographic images based on the plurality of auxiliary detection signals.

The signal processing portion 20 arranges the plurality of acquired x-y tomographic images based on the measurement depths calculated in relation to the respective x-y tomographic images. Then, the signal processing portion 20 performs, for example, three-dimensional processing (complementary processing) on the plurality of arranged x-y tomographic images to form a three-dimensional image of the object to be measured O and causes the display device to display the three-dimensional image. Such processing of the signal processing portion 20 will be described in detail later.

In this embodiment, "acquiring means" in the present invention, which acts to acquire the measurement depths related to the x-y tomographic images of the object to be measured O includes the broad-band light source 41, the half mirror 42, the fixed mirror 43, the galvanometer mirror 44, the wavelength filter 45, the diffraction grating 46, the one-dimensional photo sensor array 47, and the signal processing portion 20.

The signal processing portion 20 includes "image forming means" in the present invention, for forming each of the x-y tomographic images of the object to be measured O based on the detection signals from the CCDs 21 and 22 and "image processing means" in the present invention, for arranging the plurality of x-y tomographic images based on the acquired measurement depths.

[Structure of Control System]

Next, the control system of the optical image measuring apparatus 1 will be described with reference to FIG. 2. The control system of the optical image measuring apparatus 1 includes the processing portion 20, the CCDs 21 and 22, the piezoelectric element 9A (and the reference mirror 9), the broad-band light source 41, the galvanometer mirror 44, the one-dimensional photo sensor array 47, and the display device 60.

As described above, the galvanometer mirror 44 includes a reflecting mirror 44A disposed on the optical path of the interference light resulting from the light beam from the broad-band light source 41 and a driver portion 44B for driving the reflecting mirror 44A to change the orientation of a reflective surface thereof.

The signal processing portion 20 is composed of the computer as described above and includes a control portion 50, an image forming portion 51, a scanning control portion 52, a measurement depth calculating portion 53, an information storing portion 56, and an image processing portion 57.

The control portion 50 controls various processings such as calculation processing, image processing, and control processing which are performed by the signal processing portion 20 and is composed of a CPU or the like.

(Image Forming Portion)

The image forming portion 51 composes the "image forming means" in the present invention and performs processing for forming the x-y tomographic images of the object to be measured O based on the detection signals outputted from the CCDs 21 and 22. The image formation processing is executed by the image forming portion 51 in the same procedure as that of a conventional case. The detection signals corresponding to the measurement depths changed by the movement of the reference mirror 9 are successively inputted from the CCDs 21 and 22 to the image forming portion 51. The image forming portion 51 executes the image forming processing on the detection signals to successively form the x-y tomographic images. Here, assume that the number of x-y tomographic images for measurement is expressed by N. Then, N x-y tomographic images G1 to GN successively formed by the image forming portion 51 are stored in the information storing portion 56 by the control portion 50.

(Scanning Control Portion)

Figure 3:
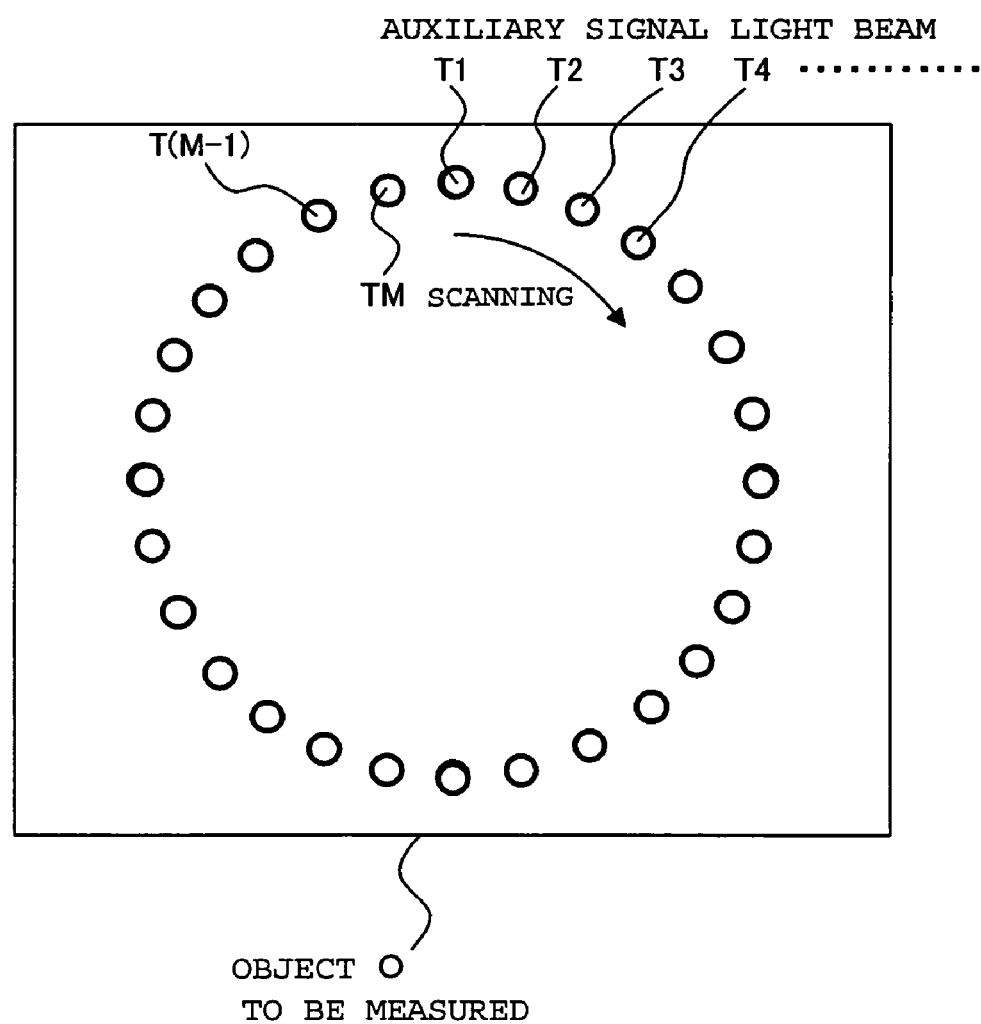
FIG. 3 is a schematic view showing an example of an auxiliary signal light scanning mode of the optical image measuring apparatus according to the first embodiment of the present invention.

The scanning control portion 52 transmits a control signal to the driver portion 44B of the galvanometer mirror 44 to change the orientation of the reflective surface of the reflecting mirror 44A. Therefore, scanning with the auxiliary signal light is performed in a direction orthogonal to the propagating direction of the signal light S. FIG. 3 illustrates an example of the scanning with the auxiliary signal light. FIG. 3 illustrates a state in which the object to be measured O is viewed from the wavelength filter 45 side in FIG. 1. FIG. 3 illustrates the trail of the auxiliary signal light in the case where the scanning with the auxiliary signal light is performed in a circular pattern on the object to be measured O. That is, according to the scanning with the auxiliary signal light, for example, a vertically upward position is set as a scanning start point T1 and scanning points T2, T3, T4, ..., T(M−1), and TM are set clockwise at predetermined intervals. At this time, the reflecting mirror 44A of the galvanometer mirror 44 is driven such that the normal to the reflective surface thereof is rotated at constant speed. In addition, the broad-band light source 41 is controlled to output M auxiliary light beams at predetermined intervals while the reflecting mirror 44A is rotated by 360 degrees. Therefore, the auxiliary detection signals related to the auxiliary interference light are outputted from the one-dimensional photo sensor array 47 at predetermined intervals.

In order to intermittently output the auxiliary light beam, a liquid crystal shutter or the like may be disposed in front of the broad-band light source for outputting the continuous auxiliary light beam and opened and closed at predetermined intervals. The continuous auxiliary light beam may be outputted from the broad-band light source 41 to perform continuous scanning with the auxiliary signal light.

(Measurement Depth Calculating Portion)

The measurement depth calculating portion 53 composes "measurement depth calculating means" in the present invention and calculates the measurement depths related to the respective x-y tomographic images G1 to GN based on the auxiliary detection signals outputted from the one-dimensional photo sensor array 47.

To explain it in more detail, the measurement depth calculating portion 53 includes a spectrum acquiring portion 54 for acquiring the wavelength spectrum of the auxiliary signal light based on the auxiliary detection signals and a profile acquiring portion 55 for performing Fourier transform on the wavelength spectrum to acquire an intensity distribution of the auxiliary interference light corresponding to the measurement depth, that is, a measurement depth profile (measurement depth information). For example, when the scanning mode of the auxiliary signal light as shown in FIG. 3 is applied, M measurement depth profiles are produced for each of the x-y tomographic images G1 to GN. The spectrum acquiring portion 54 composes "wavelength spectrum acquiring means" in the present invention and the profile acquiring portion 55 composes "measurement depth information acquiring means" in the present invention.

The measurement depth calculating portion 53 compares the M measurement depth profiles related to the x-y tomographic images G1 to GN with one another and calculates a measurement interval between the x-y tomographic images Gi and G(i+1) (i=1 to N−1) which are successively formed to acquire the measurement depths related to the x-y tomographic images G1 to GN. The acquired measurement depths are stored as measurement depth results P1 to PN in the information storing portion 56 by the control portion 50. At this time, each measurement depth result Pj is associated with a corresponding x-y tomographic image Gj (j=1 to N).

Figure 4:
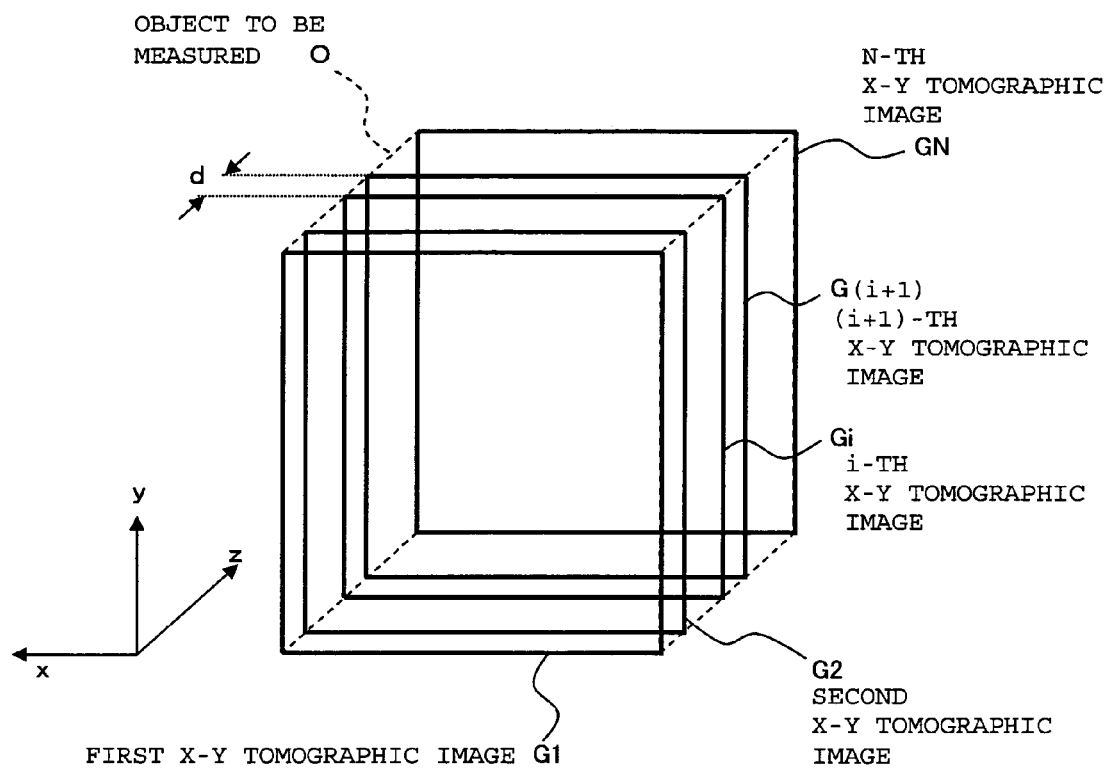
FIG. 4 is a schematic view showing an example of an x-y tomographic image measurement mode of the optical image measuring apparatus according to the first embodiment of the present invention.

The measurement depth calculating portion 53 performs, for example, the following processing. Here, assume that each scanning position Tk (k=1 to M) of auxiliary signal light at a measurement depth in which an i-th x-y tomographic image Gi (i=1 to N−1) is acquired is expressed by Tk(i). FIG. 4 illustrates an example of the scanning mode in the z-direction in the case where the x-y tomographic images G1 to GN are acquired, in which a measurement interval d between the successive x-y tomographic images Gi and G(i+1) is set to a predetermined value (assume that the object to be measured O is in a resting state). The measurement interval between the images is set based on a moving speed of the reference mirror 9 moved in the z-direction and an output cycle of the light beam from the broad-band light source 2. The temporary measurement interval d is grasped by the control portion 50 and sent to the measurement depth calculating portion 53. Each x-y tomographic image Gi may be successively acquired by stepwise movement of the reference mirror 9 instead of continuous movement of the reference mirror 9.

When the measurement for the i-th x-y tomographic image Gi shown in FIG. 4 is to be performed, the scanning control portion 52 controls the galvanometer mirror 44 to perform scanning with the auxiliary signal light in the scanning positions T1 to TM shown in FIG. 3. Auxiliary interference light resulting from auxiliary signal light reflected on each of regions depth regions in each scanning position Tk (k=1 to M) is divided into the wavelength components having $\lambda 1$ to $\lambda n$ by the diffraction grating 46. The wavelength components are detected by the one-dimensional photo sensor array 47. The spectrum acquiring portion 54 of the measurement depth calculating portion 53 acquires the wavelength spectrum as shown in FIG. 11A based on the auxiliary detection signals from the one-dimensional photo sensor array 47.

Figure 5:
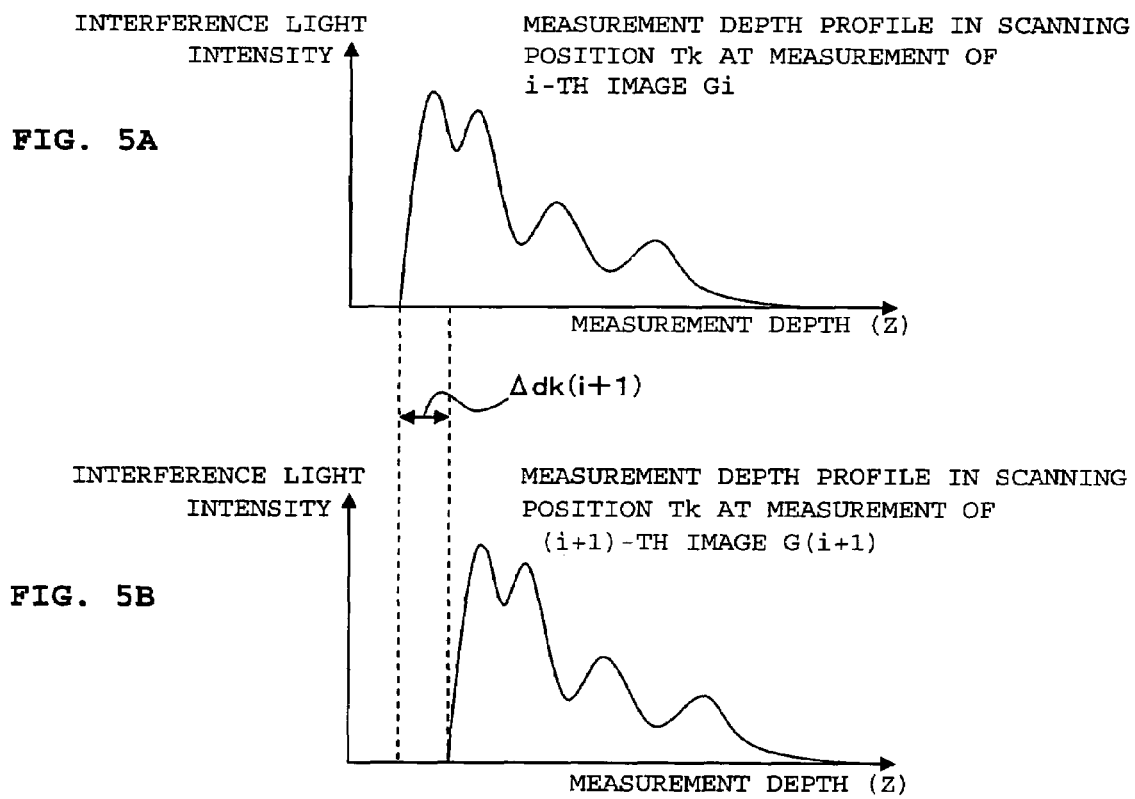
FIGS. 5A and 5B are schematic graphs showing examples of measurement depth profiles acquired by the optical image measuring apparatus according to the first embodiment of the present invention.

Then, the profile acquiring portion 55 performs Fourier transform on the wavelength spectrum to acquire a measurement depth profile as shown in FIG. 5A. In the optical image measuring apparatus 1 according to this embodiment, when the object to be measured O is assumed to be at rest, the measurement depth profile at each of the scanning positions is constantly maintained independent of the x-y tomographic image Gi.

FIG. 5B illustrates a shape of a measurement depth profile acquired when the object to be measured has been moved at the time of measurement for the x-y tomographic image G (i+1). The measurement depth profile shown in FIG. 5B is acquired by displacing the measurement depth profile shown in FIG. 5A in the measurement depth direction. Here, the amount of profile displacement between the x-y tomographic images Gi and G(i+1) in each measurement position Tk is expressed by $\Delta dk(i+1)$ (i=1 to N−1). When the object to be measured O is at rest during the measurement for the x-y tomographic images Gi and G(i+1), $\Delta dk(i+1)=0$. When the object to be measured O moves in the +z-direction, $\Delta dk(i+1)>0$. When the object to be measured O moves in the −z-direction, $\Delta dk(i+1)<0$.

The measurement depth calculating portion 53 compares the measurement depth profiles related to the x-y tomographic images Gi and G(i+1) which are successively acquired with each other to calculate the amount of profile displacement $\Delta dk(i+1)$ therebetween. Such calculation processing is performed by, for example, the pattern recognition between the respective measurement depth profiles or the parallel shift of the measurement depth profile. The amount of profile displacement of, for example, a peak value of each of the measurement depth profiles in the measurement depth direction may be calculated.

The measurement depth calculating portion 53 changes (corrects) the measurement interval d between the x-y tomographic images Gi and G(i+1) (which is set to the predetermined value as described above) based on the amount of profile displacement Δdk (i+1). That is, when the amount of profile displacement Δdk(i+1)=0, an "actual" measurement interval between the x-y tomographic images Gi and G(i+1) is set to d. When the amount of profile displacement Δdk(i+1) ≠0, the "actual" measurement interval is set to d—Δdk(i+1). The acquired actual measurement interval is associated with the x-y tomographic image Gi and stored as a measurement depth result P(i+1) in the information storing portion 56. Therefore, M measurement intervals based on Δd1(i+1) to ΔdM(i+1) corresponding to the scanning positions T1 to TM are calculated for each x-y tomographic image G(i+1) and stored as measurement depth results P(i+1).

For example, the measurement depth related to the first x-y tomographic image G1 is set as a reference (z=z1=0). A z-coordinate z2 of the second x-y tomographic image G2 is calculated based on the amount of profile displacement Δdk (2) related to the second x-y tomographic image G2. Similarly, a z-coordinate zi of the i-th x-y tomographic image Gi is calculated. Therefore, it is also possible that the measurement depths (z-coordinates) z1 to zN related to the respective x-y tomographic images G1 to GN are acquired and stored as the measurement depth results P1 to PN in association with the respective x-y tomographic images G1 to GN.

An average value Δd(i+1) of the amount of profile displacements Δd1(i+1) to ΔdM(i+1) acquired corresponding to the scanning positions T1 to TM may be calculated and the measurement interval between the x-y tomographic images Gi and G(i+1) may be acquired based on the average value Δd(i+1).

(Information Storing Portion)

The information storing portion 56 is composed of a storage device such as an image memory or a hard disk drive. Directories are allocated to information stored in the information storing portion 56. The directories are associated with one another to associate the stored information with one another. In particular, the x-y tomographic image Gi and the measurement depth result Pi are stored in association with one another (i=1 to N). Storage processing and association processing on the information storing portion 56 are executed by the control portion 50.

(Image Processing Portion)

The image processing portion 57 composes "image processing means" in the present invention and arranges the x-y tomographic images G1 to GN in the measurement depth direction (z-direction) based on the measurement depth results P1 to PN related to the x-y tomographic images G1 to GN which are acquired by the measurement depth calculating portion 53. The image processing portion 57 performs image processing (for example, complementary processing such as three-dimensional processing) on the x-y tomographic images G1 to GN arranged in the measurement depth direction to form a three-dimensional image of the object to be measured O, a tomographic image thereof (x-z tomographic image or y-z tomographic image) in the measurement depth direction, or a tomographic image thereof in a direction oblique to an x-axis, a y-axis, or a z-axis.

To explain it in more detail, the image processing portion 57 reads out the x-y tomographic images G1 to GN from the information storing portion 56 and arranges the x-y tomographic images G1 to GN in the z-direction based on the measurement intervals Δd1(i+1) to ΔdM(i+1) between the x-y tomographic images Gi and G(i+1) (i=1 to N−1) which are included in the measurement depth results P1 to PN. When the z-coordinate zi of each x-y tomographic image Gi is stored as the measurement depth result Pi (i=1 to N), each x-y tomographic image Gi is arranged on the z-coordinate zi axis. The image processing portion 57 complements the x-y tomographic images G1 to GN arranged according to the measurement intervals or the z-coordinates using an x-y tomographic image between the successive x-y tomographic images Gi and G(i+1) to form the three-dimensional image of the object to be measured O.

When the x-z tomographic image of the object to be measured O (at an arbitrary y-coordinate y0) is to be formed, the image processing portion 57 arranges partial images of the respective x-y tomographic images Gi (i=1 to N) which are located at y=Y0 in the z-direction based on the measurement depth results Pi. Then, the image processing portion 57 performs complementary processing on the partial images to form the x-z tomographic image. Even when the y-z tomographic image of the object to be measured O (at an arbitrary x-coordinate x0) is to be formed, the same processing is performed.

When the tomographic image of the object to be measured O in the direction oblique to the x-axis, the y-axis, the z-axis is to be formed, for example, only a part of the three dimensional image which intersects with the oblique plane (cross sectional plane) is extracted therefrom. Even when the x-z tomographic image or the y-z tomographic image is to be formed, a slice image may be similarly extracted from the three dimensional image.

The three dimensional image or the like which is formed by the image processing portion 57 is displayed on a display device 60 by the control portion 50. The formed three dimensional image or the like may be stored in the information storing portion 56.

[Measurement Mode]

Subsequently, a measurement mode on the spatial signal intensity distribution of the interference light L and the spatial phase distribution thereof, that is, a measurement mode on the heterodyne signal intensity and its phase information, which is executed by the optical image measuring apparatus 1 according to this embodiment will be described. The following detailed signal processing is executed by the signal processing portion 20 shown in FIG. 1.

The optical image measuring apparatus 1 of this embodiment forms the signal light S and the reference light R whose polarization characteristics are different from each other and detects the interference light L of those as the heterodyne signal to obtain a surface image or a tomographic image of the object to be measured O.

[Measurement Principle]

First, the basic principle of measurement mode executed by the optical image measuring apparatus 1 will be described. The light beam outputted from the broad-band light source 2 is converted to the linearly polarized light in the angle direction of 45° relative to the x-axis by the polarizing plate 3. The beam diameter of the converted linearly polarized light is increased by the lenses 4 and 5 and the linearly polarized light whose beam diameter is increased is converted to the parallel light beam thereby. Then, the light beam is incident on the half mirror 6 and divided into two, that is, the signal light S and the reference light R.

The signal light S is incident on the object to be measured O, which is made of a scattering medium, and reflected on a surface thereof and sectional surfaces at various depths. A part of a reflection light wave from the object to be measured O is reflected on the half mirror 6 and propagates to the imaging lens group 10.

On the other hand, the reference light R passes through the wavelength plate 7 and propagates to the reference mirror 9. At this time, the reference mirror 9 is driven (z-scanning is performed) in the optical direction of the reference light R by the piezoelectric element 9A. The reference light R is subjected to frequency shift having a predetermined amount by the frequency shifter 8. A reflection light wave on the reference mirror 9 is subjected to Doppler frequency shift by the z-scanning of the reference mirror 9 and further subjected to frequency shift by the frequency shifter 8, and then passes through the wavelength plate 7. Here, because the polarization characteristic of the reference light R is the linear polarization of 45° and the wavelength plate 7 is the ⅛-wavelength plate, the polarization characteristic of the reference light R passing through the wavelength plate 7 two times is converted to the circular polarization. A part of the reference light R whose polarization characteristic is converted to the circular polarization passes through the half mirror 6 and propagates to the imaging lens group 10.

At this time, the half mirror 6 superimposes the signal light S of the linear polarization which is reflected on the object to be measured O and the reference light R whose frequency is shifted and polarization characteristic is converted to the circular polarization on each other to produce the interference light L, which is transmitted to the imaging lens group 10. The interference light L propagates to the polarization beam splitter 11 through the imaging lens group 10.

The polarization beam splitter 11 acts to reflect the S-polarized light component L1 of the interference light L and to transmit the P-polarized light component L2 thereof. The S-polarized light component L1 of the interference light L is detected by the CCD 21 and the P-polarized light component L2 thereof is detected by the CCD 22. The S-polarized light component L1 of the interference light L includes an S-polarized light component Ess of the signal light S and an S-polarized light component Ers of the reference light R. The P-polarized light component L2 of the interference light L includes a P-polarized light component Esp of the signal light S and a P-polarized light component Erp of the reference light R. The S-polarized light component Ess of the signal light S, the P-polarized light component Esp thereof, the S-polarized light component Ers of the reference light R, and the P-polarized light component Erp thereof each are expressed by the following expressions.

$$Ess = \sqrt{I_{ss}} \sin(2\pi f t + \phi) \quad (2)$$

$$Esp = \sqrt{I_{sp}} \sin(2\pi f t + \phi) \quad (3)$$

$$Ers = \sqrt{I_{rs}} \sin[2\pi(f+f_D)t + \phi'] \quad (4)$$

$$Erp = \sqrt{I_{rp}} \sin[2\pi(f+f_D)t + \phi' + 90°] \quad (5)$$

Here, f indicates a frequency of the light beam emitted from the broad-band light source 2, $f_D$ indicates a frequency shift, $\phi$ indicates an initial phase of the signal light S, and $\phi'$ indicates an initial phase of the reference light R. Assume that a difference between the initial phase of the signal light S and the initial phase of the reference light R is given by $\Delta\phi (=\phi - \phi')$. Referring to the expressions (2) to (5), the S-polarized light component L1 of the interference light L and the P-polarized light component L2 thereof are detected by the CCDs 21 and 22 as heterodyne signals $i_1$ and $i_2$ expressed by the following expressions.

$$i_1 \propto |E_{ss} + E_{rs}|^2 \propto I_{rs} + I_{ss} + 2\sqrt{I_{rs}I_{ss}} \cos(2\pi f_D t + \Delta\phi) \quad (6)$$

$$i_2 \propto |E_{sp} + E_{rp}|^2 \propto I_{rp} + I_{sp} + 2\sqrt{I_{rp}I_{sp}} \sin(2\pi f_D t + \Delta\phi) \quad (7)$$

As is apparent from the comparison between the expressions (6) and (7), a phase difference between the alternating signals of the third terms of the respective expressions is 90° because of the cosine and sine functions with the same phase. In the present invention, in addition to utilizing such a feature, the light beams whose intensity is periodically modulated is used as measurement light to allow the realization of optical heterodyne detection without sampling processing using shutters, thereby measuring the signal intensity of the interference light L and the spatial phase distribution thereof. In a conventional optical image measuring technique, single interference light is sampled using a plurality of functions having different phases to detect cosine and sine components thereof. In contrast to this, the feature of the present invention is that the polarization characteristics of the reference light R and the signal light S are converted to produce the plurality of (two in this embodiment) interference light components having the different phases and the produced interference light components are separately detected. Hereinafter, measurement fundamentals in the present invention will be described.

In this embodiment, the light beam whose intensity is periodically modulated is outputted from the broad-band light source 2 using the light source 31, the beam splitter 32, the reflecting mirror 33, the photo detector (PD) 34, and the pulse driver 35.

The laser light outputted from the light source 31 is divided into an optical path in the reference mirror 9 direction (reflection laser light beam) and an optical path in the fixed mirror 33 direction (transmission laser light beam) by the beam splitter 32. The laser light beam on the optical path in the reference mirror 9 direction propagates through the frequency shifter 8 and the reference mirror 9 to be subjected to frequency shift by those and then is incident on the beam splitter 32 again. On the other hand, the laser light beam on the optical path in the fixed mirror 33 direction is incident, as reflection light on the fixed mirror 33, on the beam splitter 32 again (without frequency shift). The laser light beams propagating on both the optical paths are superimposed on each other by the beam splitter 33 to produce interference light. The interference light is detected by the photo detector 34.

As in the case of the reference light R, the interference light detected by the photo detector 34 is subjected to the frequency shift using the frequency shifter 8 and the Doppler frequency shift using the reference mirror 9, so the interference light is subjected to frequency shift having the amount of shift (substantially) equal to that of the reference light R. Therefore, the interference light has a beat frequency (substantially) equal to that of the interference light L produced from the signal light S and the reference light R.

The photo detector 34 outputs an electrical signal corresponding to the detected interference light to the pulse driver 35. As in the case of the heterodyne signal expressed by the expression (1), the electrical signal includes a direct current component and an alternating current component. The alternating current component has a frequency substantially equal to the beat frequency of the interference light L as described above. When receiving the electrical signal from the photo detector 34, the pulse driver 35 outputs a pulse signal having a frequency equal to that of the electrical signal to the broad-band light source 2. The broad-band light source 2 is driven based on the pulse signal outputted from the pulse driver 35 and outputs a pulsed light beam having a repetition frequency equal to that of the pulse signal.

As described above, in this embodiment, the amount of shift of the frequency shift which is applied to the reference light R is monitored and the object to be measured O is measured using a pulsed light beam having a pulse repetition frequency (substantially) equal to the amount of shift. As described above, the light beam from the broad-band light source 2 is outputted as, for example, pulsed light of a rectangular train with a duty of 50%. The duty ratio of the light beam is not limited to 50%. The pulse shape may be other than the rectangular train (for example, a triangular train or a trapezoidal train). For example, a light beam obtained by modulation between output intensities of 50 and 100 can be also applied instead of pulsed light obtained by switching between output intensities of 0 and 100. That is, the important point is not to control the modulation degree of the intensity of the light beam but to control a frequency for modulation of the intensity thereof such that the frequency becomes substantially equal to the beat frequency of the interference light L.

Figure 6:
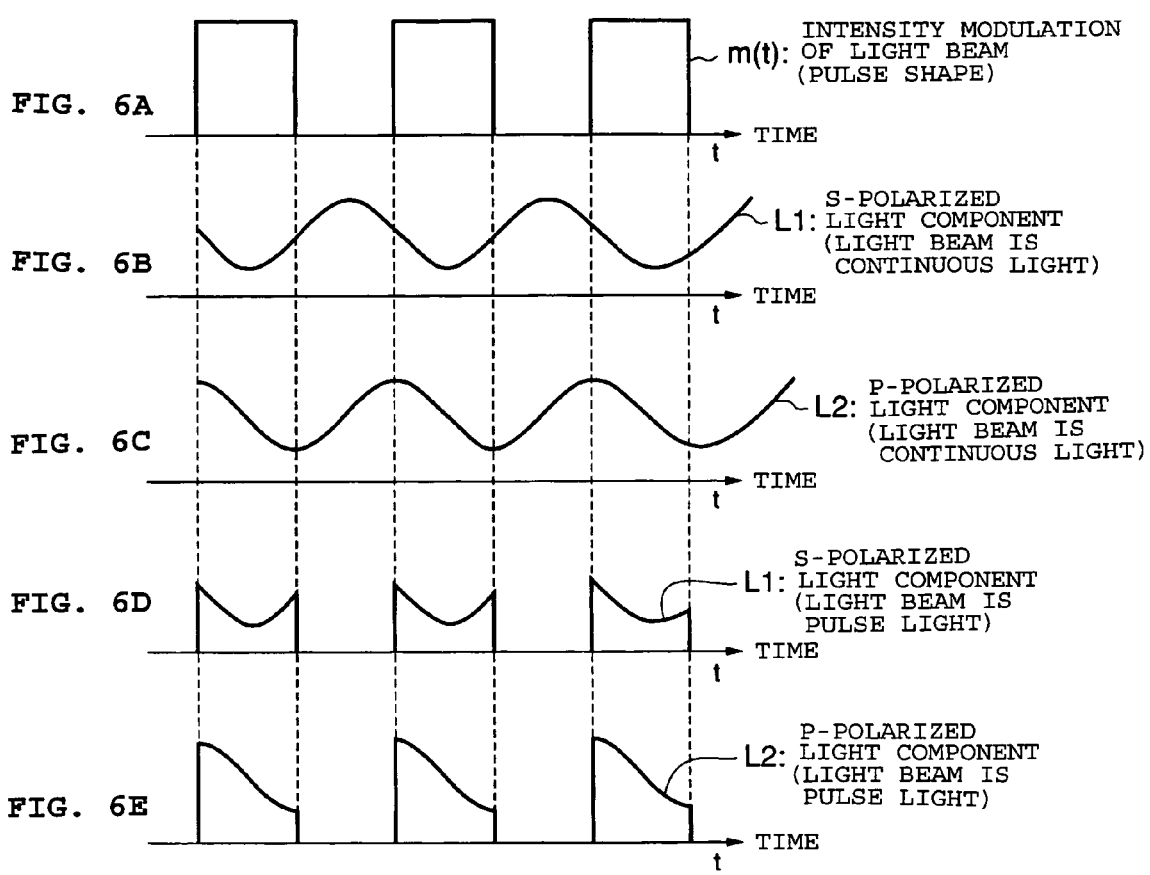

Next, a detection mode of the interference light L in the optical image measuring apparatus 1 according to this embodiment will be described with reference to graphs shown in FIG. 6. Hereinafter, assume that a modulation frequency of the intensity of the light beam outputted from the broad-band light source 2 is $f_m$. As described above, $f_D$ indicates the frequency shift applied to the reference light R (beat frequency of the interference light L). Assume that the modulation frequency $f_m$ of the light beam is equal to or closer to the frequency shift $f_D$.

FIG. 6A shows a temporal waveform of a light beam which is subjected to intensity modulation at the modulation frequency $f_m$ and outputted from the broad-band light source 2. FIG. 6B shows a temporal waveform of the S-polarized light component L1 of the interference light L (beat frequency $f_D$) in the case where the light beam is continuous light and thus the reference light R and the signal light S each are continuous light. FIG. 6C shows a temporal waveform of the P-polarized light component L2 of the interference light L in the case where the reference light R and the signal light S each are continuous light. Note that a phase difference between the S-polarized light component L1 and the P-polarized light component L2 as shown in FIGS. 6B and 6C is 90°.

FIG. 6D shows a temporal waveform of the S-polarized light component L1 of the interference light L in the case where the light beam from the broad-band light source 2 is subjected to the intensity modulation as shown in FIG. 6A (this corresponds to FIG. 6B). FIG. 6E shows a temporal waveform of the P-polarized light component L2 of the interference light L in the case where the light beam from the broad-band light source 2 is subjected to the intensity modulation as shown in FIG. 6A (this corresponds to FIG. 6C). A phase difference between the S-polarized light component L1 and the P-polarized light component L2 as shown in FIGS. 6D and 6E is 90°.

The CCD 21 detects the S-polarized light component L1 having the temporal waveform shown in FIG. 6D. The light beam from the broad-band light source 2 is a light pulse of a rectangular train having the frequency $f_m$ and a duty of 50%. When a difference between the modulation frequency $f_m$ and the beat frequency $f_D$ of the interference light L ($\delta f = |f_m - f_D|$) is sufficiently smaller than a response frequency of the CCD 21 serving as the storage type photo sensor, a detection signal of the S-polarized light component L1 which is outputted from the CCD 21 becomes proportional to the amount of photo charge stored for a detection period. Therefore, the detection signal is expressed by the following expression (for example, see M. Akiba, K. P. Chan, and N. Tanno, Japanese Journal of Applied Physics, Vol. 39, L1194 (2000)).

$$S_1(t) = \langle K_1 m(t) i_1(t) \rangle \tag{8}$$

$$= K_1 \left[ \frac{1}{2} I_{ss} + \frac{1}{2} I_{rs} + \frac{2}{\pi} \sqrt{I_{ss} I_{rs}} \cos(2\pi \delta f t + \beta) \right]$$

Here, <.> indicates a time average produced by a storage effect of the CCD 21. In addition, $K_1$ indicates photo detection efficiency including reflectance of the polarization beam splitter 11 and a photoelectric conversion rate of the CCD 21, m(t) indicates a function for modulating the output intensity of the broad-band light source 2 (function indicating a rectangular pulse), and β indicates an initial phase value for measurement. As is apparent from the expression (8), the detection signal outputted from the CCD 21 includes the term related to an amplitude $\sqrt{I_{ss} I_{rs}}$ of the S-polarized light component L1 of the interference light L and a phase ($2\pi\delta ft + \beta$) thereof in addition to the term related to the intensity of the signal light S and the term related to the intensity of the reference light R (background light component).

Similarly, the CCD 22 detects the P-polarized light component L2 having the temporal waveform shown in FIG. 6E and outputs a detection signal as expressed by the following expression.

$$S_2(t) = K_2 \left[ \frac{1}{2} I_{sp} + \frac{1}{2} I_{rp} + \frac{2}{\pi} \sqrt{I_{sp} I_{rp}} \sin(2\pi \delta f t + \beta) \right] \tag{9}$$

Here, $K_2$ indicates photo detection efficiency including transmittance of the polarization beam splitter 11 and a photoelectric conversion rate of the CCD 22.

Next, calculation processing of the signal intensity of the interference light L based on the detection signals (expressed by the expressions (8) and (9)) outputted from the CCDs 21 and 22 will be described.

Because the reference light R is converted to the circularly polarized light by the wavelength plate 7, it can be considered that an intensity $I_{rs}$ of the S-polarized light component Ers of the reference light R is equal to an intensity $I_{rp}$ of the P-polarized light component Erp thereof (this indicates $I_{rs} = I_{rp} = I_r$).

On the other hand, it is assumed that the reflection light of the signal light S on the object to be measured O does not significantly depend on the polarization characteristic of the incident light thereof, so it can be considered that an intensity $I_{ss}$ of the S-polarized light component Ess of the signal light S is equal to or close to the intensity $I_{sp}$ of the P-polarized light component Esp thereof (this indicates $I_{ss} = I_{sp} = I_s$). Because the signal light S is scattered or absorbed in the object to be measured O, it can be assumed that the intensity thereof is generally sufficiently smaller than that of the reference light R ($I_s << I_r$).

The first term and the second term of the right side of each of the expressions (8) and (9) indicate the intensity of the background light. The intensity of the background light can be measured in advance or separately. For example, a light beam which is continuous light is outputted from the broad-band light source 2 and detected by the CCD 21 and the like. The detected light beam is integrated for a period corresponding to one wavelength (or integral multiple thereof) and the third term (alternating current component; phase quadrature component) is cancelled. Therefore, it is possible to obtain the intensity of the background light (background light component).

The obtained background light component is divided by the intensities of the detection signals from the CCDs 21 and 22 to calculate phase quadrature components of the detection signals, that is, a phase quadrature component $S_1'(t)$ of the S-polarized light component L1 of the interference light L and a phase quadrature component $S_2'(t)$ of the P-polarized light component L2 thereof (see the following expressions).

$$S_1'(t) = K_1 \frac{2}{\pi} \sqrt{I_s I_r} \cos(2\pi \delta f t + \beta) \tag{10}$$

$$S_2'(t) = K_2 \frac{2}{\pi} \sqrt{I_s I_r} \sin(2\pi \delta f t + \beta) \tag{11}$$

When the expressions (10) and (11) are used, the amplitude of the S-polarized light component L1 of the interference light L and the amplitude of the P-polarized light component L2 thereof are expressed by the following expression.

$$\sqrt{I_s I_r} \propto \sqrt{S_1'^2 + S_s'^2} \tag{12}$$

The optical image measuring apparatus 1 according to this embodiment produces an image of a spatial phase distribution of the interference light L as follows.

Assume that, at a measurement time $t=t_1$, a phase quadrature component $S_1'(t_1)$ of the S-polarized light component L1 of the interference light L is detected by the CCD 21 and a phase quadrature component $S_2'(t_1)$ of the P-polarized light component L2 thereof is detected by the CCD 22. When a ratio between both the phase quadrature components is calculated, the following signal is obtained.

$$S_3 = \frac{S_2'(t_1)}{S_1'(t_1)} = \tan(2\pi \delta f t_1 + \beta) \tag{13}$$

As is apparent from the expression (13), a signal $S_3$ expressed thereby does not depend on the amplitude of the interference light L and is composed of only phase information. In this embodiment, the S-polarized light component L1 and the P-polarized light component L2 are detected by the CCDs 21 and 22, each of which has a light receiving surface on which a plurality of pixels are two-dimensionally arranged. Therefore, a phase $\beta(x, y, t_1)$ of a signal detected from each of the pixels is expressed by the following expression (where (x, y) indicates coordinates of each of the pixels on the light receiving surface).

$$\beta(x, y, t_1) = \tan^{-1}\left[\frac{S_2'(x, y, t_1)}{S_1'(x, y, t_1)}\right] - 2\pi \delta f t_1 \tag{14}$$

The second term of the expression (14) is an instantaneous phase value of an alternating current signal having a frequency δf of zero or substantially zero (≈0) at the measurement time $t_1$, so it can be considered that the phase value is maintained constant regardless of the positions of the pixels of the CCDs 21 and 22, that is, the coordinates (x, y) thereof. Therefore, for example, a difference between a reference phase $\Phi(x_1, y_1, t_1)$ of a detection signal detected from a pixel located at a specific point ($x=x_1$, $y=y_1$) on the light receiving surface of each of the CCDs 21 and 22 and a phase of a detection signal detected from each of the pixels is obtained. Thus, it is possible to image a spatial phase difference distribution of the heterodyne signals, that is, a spatial phase difference distribution of the interference light L.

The frequency information of the interference light L can be also obtained from the phase information thereof. Assume that the phases of the interference light L (S-polarized light component L1 and P-polarized light component L2) at two measurement times $t=t_1$ and $t=t_2$ are denoted by $\beta(x, y, t_1)$ and $\beta(x, y, t_2)$. Then, the difference δf between the beat frequency $f_D$ of the interference light L and the modulation frequency $f_m$ of the light beam from the broad-band light source 2 is expressed by the following expression.

$$\delta f = \frac{1}{2\pi} \left| \frac{\beta(x, y, t_1) - \beta(x, y, t_2)}{t_1 - t_2} \right| \tag{15}$$

Because the modulation frequency $f_m$ of the light beam is known, the heterodyne frequency, that is, the beat frequency $f_D$ of the interference light L can be calculated based on the expression (10) or (11). It can be considered that the heterodyne frequency measuring method is effective for, for example, Doppler velocity measurement using a heterodyne interference method.

[Operation and Effect]

According to the optical image measuring apparatus 1 in this embodiment, the plurality of x-y tomographic images of the object to be measured O which are acquired based on the above-mentioned principles are arranged in the z-direction (measurement depth direction). The plurality of arranged x-y tomographic images are subjected to image processing to form, for example, the three-dimensional image of the object to be measured O. The plurality of x-y tomographic images are arranged based on the measurement intervals (or z-coordinates) calculated for the respective x-y tomographic images. Therefore, even when the object to be measured O moves or propagates during the measurement, the measurement depths related to the respective x-y tomographic images can be preferably changed (corrected). Thus, the three-dimensional image or the like can be formed with high precision.

When scanning with the auxiliary signal light is performed, the measurement depths in the plurality of scanning positions related to each of the x-y tomographic images can be obtained. Therefore, even when the object to be measured O executes rotational movement, it is possible to correct the x-y tomographic image by rotation in a direction canceling out a displacement caused by the rotational movement. For example, when the displacements of the measurement depth profiles in a set of scanning positions opposed to each other, such as the scanning positions T1 and T(M/2+1) (M is an even number) shown in FIG. 3 are compared with each other, a rotational direction of the object to be measured O and the amount of rotation thereof can be determined and the x-y tomographic image can be corrected by rotation in a direction canceling out the amount of rotation in the determined rotational direction. The following processing may also be performed. That is, scanning positions opposed to each other in each of the x-, y-, and z-directions are compared with each other to acquire the amount of rotation in the x-direction, the amount of rotation in the y-direction, and the amount of rotation in the z-direction. The acquired amounts of rotation are combined with one another to acquire the three-dimensional amount of rotation of the object to be measured O.

According to such processing, for example, the three-dimensional image of the object to be measured O can be formed with higher precision.

The scanning with the auxiliary signal light can be performed along an arbitrary trail. In the optical image measuring apparatus according to the present invention, the scanning with the auxiliary signal light is unnecessary. It is only necessary to perform the measurement at only one point for each of the x-y tomographic images.

MODIFIED EXAMPLES

In the above-mentioned embodiment, the scanning with the auxiliary signal light is performed using the galvanometer mirror. However, the scanning means in the present invention is not limited to the galvanometer mirror and thus an arbitrary structure capable of suitably performing the scanning with the auxiliary signal light can be employed.

The wavelength filter is used as the combining and separating means in the present invention, for combining the auxiliary signal light with the signal light and separating the auxiliary signal light from the signal light. A beam splitter or the like can be alternatively used.

The one-dimensional photo sensor array is used as the auxiliary detection means in the present invention, for detecting the auxiliary interference light. For example, a two-dimensional photo sensor array such as a CCD may be used instead. In view of the precision of the formed three-dimensional image or the like, it may be desirable that a one-dimensional photo sensor array having a high readout speed be used to acquire measurement depths in a larger number of scanning positions.

In the above-mentioned optical image measuring apparatus, both the structure using the frequency shifter 8 and the structure using the reference mirror 9 and the piezoelectric element 9A are used to apply the frequency shift to the reference light R. The apparatus may include only one of the structures. For example, even when an optical image measuring apparatus without being provided the frequency shifter 8 is produced in order to apply the frequency shift to the reference light R only by the z-scanning of the reference mirror 9, the same measurement can be executed. When the frequency shifter 8 is to be used, it may be provided on the optical path of the signal light S. This is because it is sufficient that the frequency of the signal light S and the frequency of the reference light R at the time of superimposition be shifted relative to each other in the image measurement according to the present invention.

In the above-mentioned structure, the light beam from the broad-band light source 2 is converted to the linearly polarized light and then divided into the signal light S and the reference light R. Each of the signal light S and the reference light R may be converted to the linearly polarized light after the division of the light beam. In such a case, it is necessary to provide a polarizing plate on each of the optical path of the signal light S and the optical path of the reference light R, so the optical image measuring apparatus becomes slightly more complex than the above-mentioned structure. Therefore, the above-mentioned structure may be more suitable in practical use.

In the above-mentioned structure, the polarization characteristic of the reference light R is converted to the circular polarization. It is also possible that the signal light S is converted to the circularly polarized light and superimposed on the reference light R which is the linearly polarized light. However, as described above, the reflection light of the signal light S on the object to be measured O is slightly weaker than the reference light R. Therefore, when the wavelength plate is disposed on the optical path of the signal light S, the signal light S passing therethrough weakens. The weakening of the intensity of the signal light S including information related to the object to be measured O may affect measurement sensitivity. Thus, the above-mentioned structure in which the polarization characteristic of the reference light R is converted to the circular polarization has an advantage. Note that the same is expected in the case where the frequency shifter is disposed.

In the above-mentioned structure, the light source 31, the beam splitter 32, the fixed mirror 33, and the photo detector 34 are provided to monitor the amount of frequency shift of the reference light R and a monitoring result is fed back for the intensity modulation of the light beam. For example, when the amount of frequency shift applied to the reference light R is set, the pulse driver 35 for automatically generating a pulse signal having a frequency (substantially) equal to the set amount of frequency shift may be provided to control the intensity modulation of the light beam.

The broad-band light source 2 for emitting a continuous light beam (continuous light) and a shutter for periodically cutting off the continuous light beam instead of the pulse driver 35 for pulse-driving the broad-band light source 2 may be provided to periodically modulate the intensity of the light beam. In such a case, the shutter composes "shutter means" in the present invention and the broad-band light source 2 and the shutter compose "light beam outputting means" in the present invention. Even when such a structure is applied, only a single shutter for light beam cutoff may be provided. Therefore, as compared with a conventional structure in which a plurality of interference light beams are sampled using a plurality of shutters synchronized with each other, both the apparatus structure and the control mode can be simplified.

Second Embodiment

An optical image measuring apparatus according to a second embodiment of the present invention will be described. In the first embodiment, the light source (broad-band light source 41) different from the light source for image measurement (broad-band light source 2) is provided to acquire the measurement depth related to the X-y tomographic image. In contrast to this, in this embodiment, a part of interference light caused based on the light source for image measurement is detected to acquire the measurement depth related to the X-y tomographic image.

Figure 7:
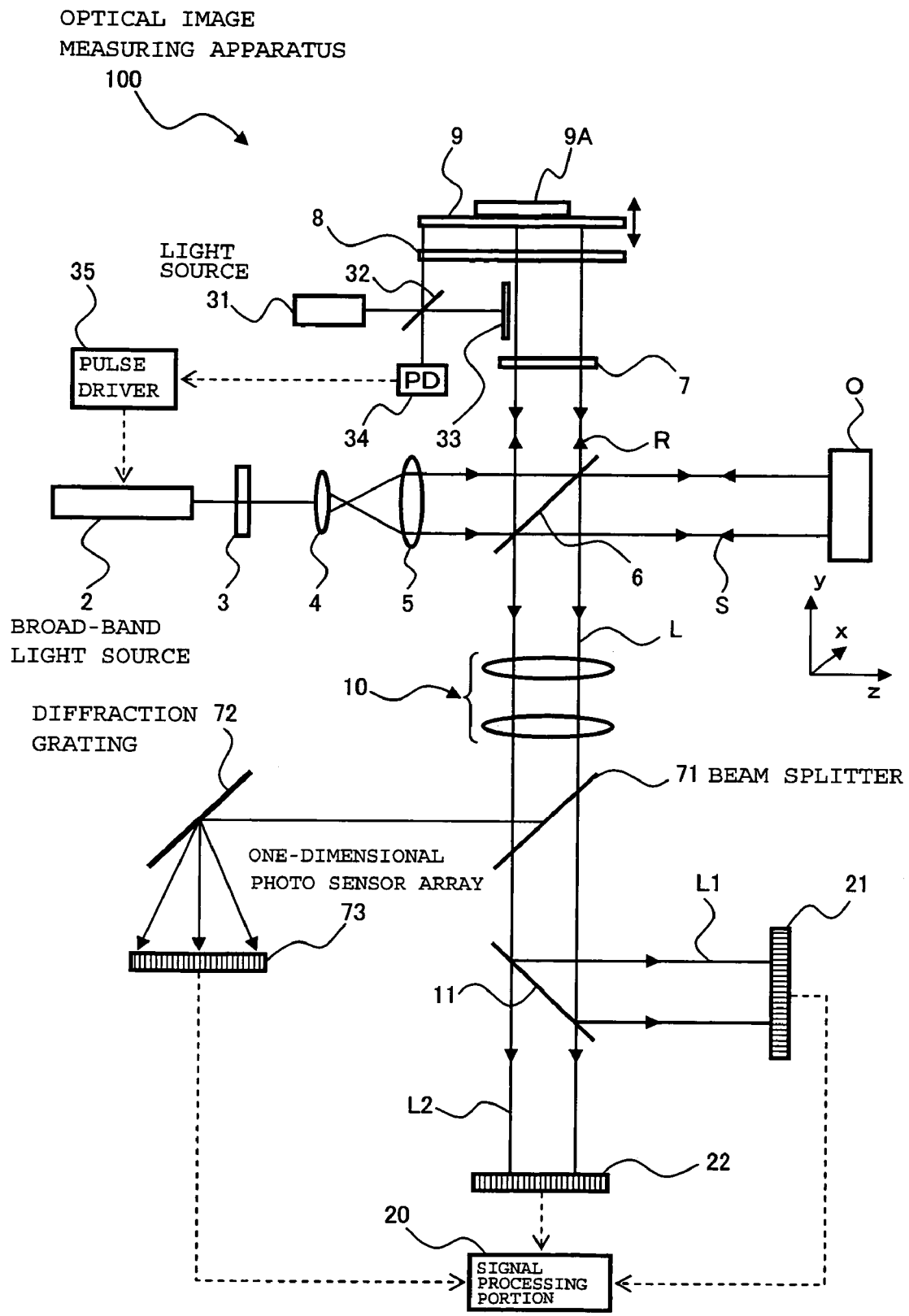
FIG. 7 is a schematic diagram showing an example of an optical image measuring apparatus according to a second embodiment of the present invention.
Figure 8:
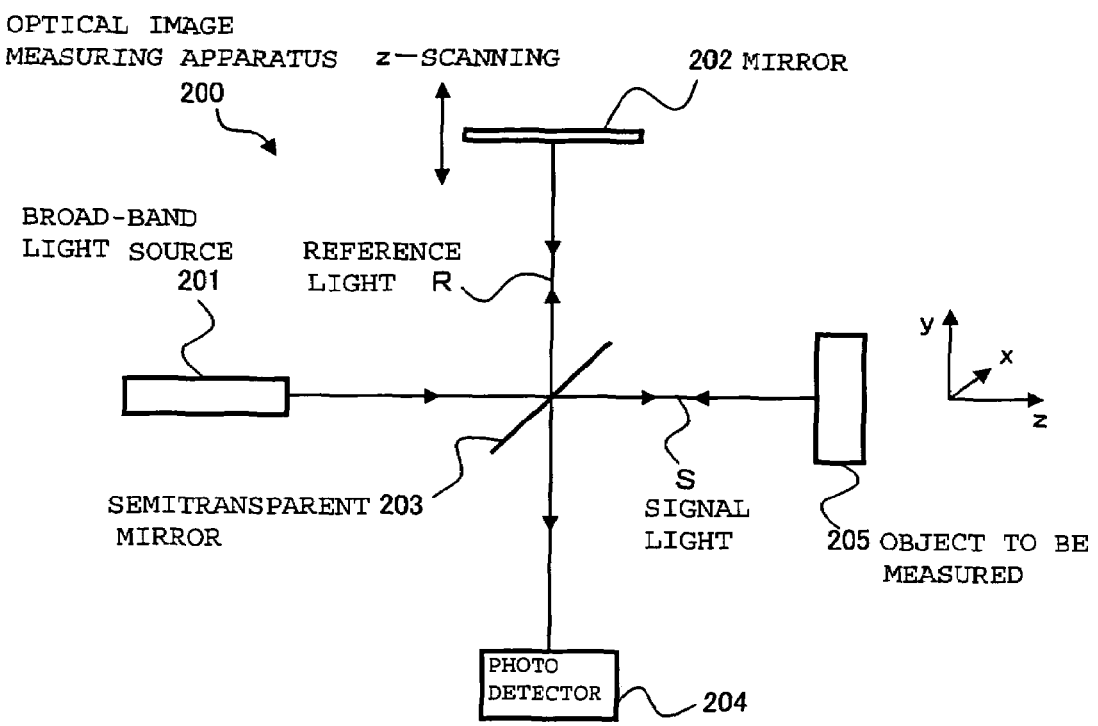
FIG. 8 is a schematic diagram showing a conventional optical image measuring apparatus.
Figure 9:
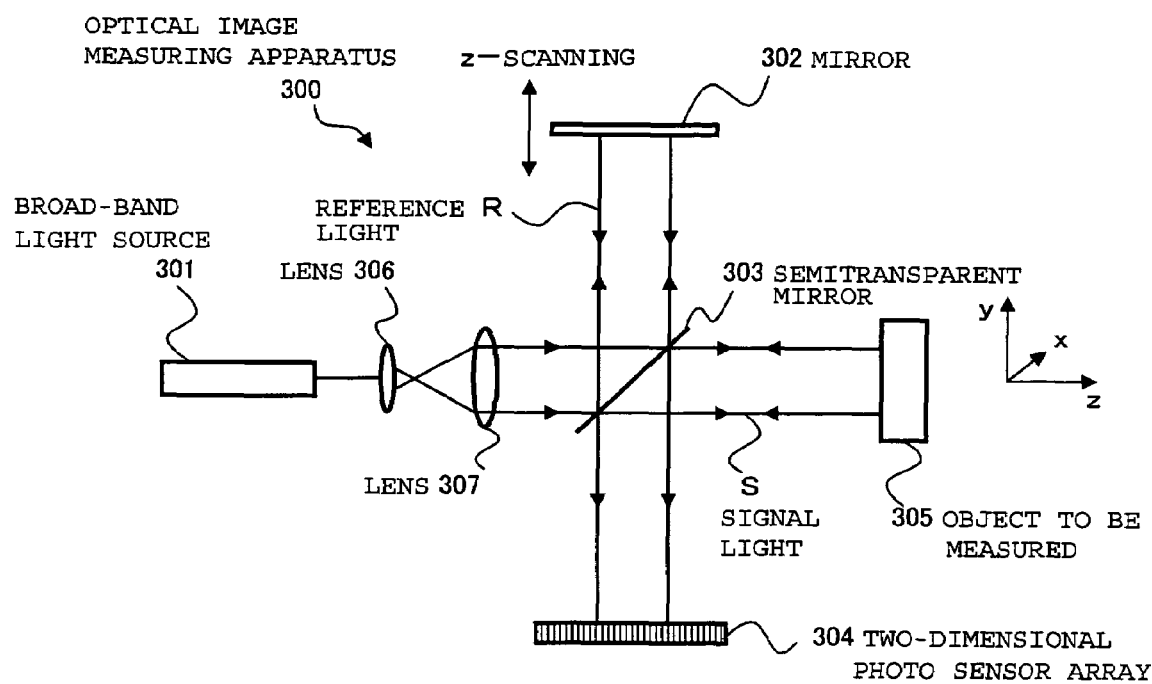
FIG. 9 is a schematic diagram showing a conventional optical image measuring apparatus.
Figure 10:
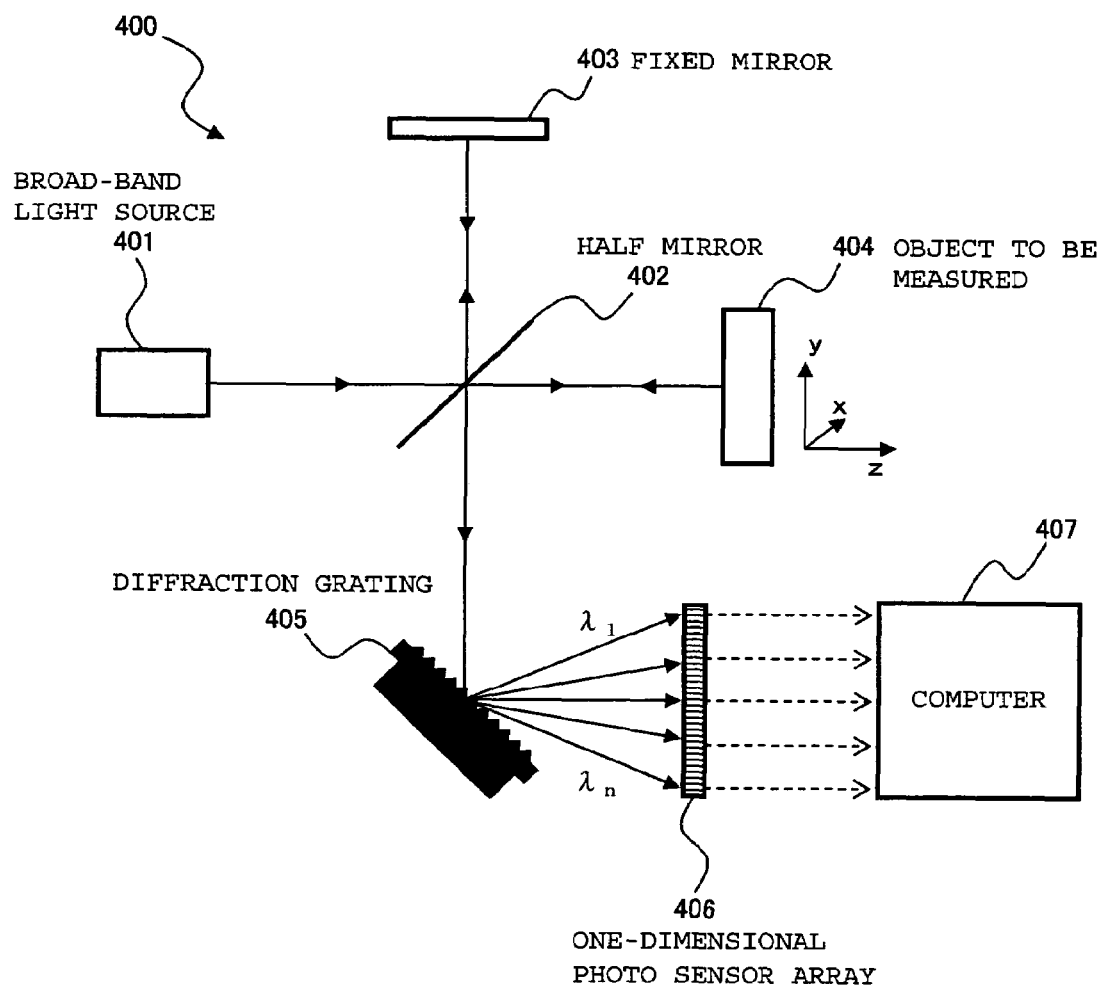
FIG. 10 is a schematic diagram showing a conventional optical image measuring apparatus.

FIG. 7 illustrates an example of the optical image measuring apparatus according to this embodiment. An optical image measuring apparatus 100 shown in FIG. 7 has substantially the same structure as that of the optical image measuring apparatus 1 according to the first embodiment. In FIG. 7, same reference symbols are provided to the same constituent portions as those in FIG. 1.

The optical image measuring apparatus 100 according to this embodiment includes a beam splitter 71 which is tilted relative to the optical path of the interference light L produced by the half mirror 6 and used to separate a part of the interference light L therefrom. The beam splitter 71 composes "interference light separating means" in the present invention.

The part of the interference light L separated by the beam splitter 71 is separated into a plurality of wavelength components by a diffraction grating 72 (wavelength component separating means) tilted relative to an optical path of the part of the interference light L. The wavelength components are detected by a one-dimensional photo sensor array 73 (auxiliary detection means). The one-dimensional photo sensor array 73 outputs detection signals corresponding to the detected wavelength components (auxiliary detection signals) to the signal processing portion 20.

The signal processing portion 20 has the same structure as that in the first embodiment (see FIG. 2). The measurement depths of the respective x-y tomographic images formed based on the detection signals from the CCDs 21 and 22 are calculated by the measurement depth calculating portion 53. The x-y tomographic images are arranged in the z-direction (measurement depth direction) based on the measurement depths by the image processing portion 57. Then, the signal processing portion 20 performs image processing on the plurality of arranged x-y tomographic images to form, for example, a three-dimensional image of the object to be measured O and causes the display device to display the formed three-dimensional image. In this embodiment, "acquiring means" in the present invention is composed of the beam splitter 71, the diffraction grating 72, the one-dimensional photo sensor array 73, and the signal processing portion 20 (measurement depth calculating portion 53).

In this embodiment, the displacement of the measurement depth profile includes a change in optical path length of the reference light R, so a value obtained by subtracting the change in optical path length of the reference light R from the displacement of the measurement depth profile corresponds to the amount of displacement of the object to be measured O. As is apparent from the structure of the control system shown in FIG. 2, the change in optical path length of the reference light R which is caused by the piezoelectric element 9A is controlled by the control portion 50. Therefore, the change in optical path length is grasped by the control portion 50. The measurement depth calculating portion 53 (measurement depth calculating means) calculates the measurement depth of the x-y tomographic image based on information regarding the change from the control portion 50.

According to the optical image measuring apparatus 100 in this embodiment as described above, as in the first embodiment, even when the object to be measured O moves or propagates during the measurement, the measurement depths related to the respective x-y tomographic images can be preferably changed (corrected). Thus, the three-dimensional image or the like can be formed with high precision.

VARIOUS MODIFIED EXAMPLES

The above-mentioned detailed structures are merely structural examples for embodying the optical image measuring apparatus according to the present invention. Therefore, arbitrary modifications can be made without departing from the spirit of the present invention.

For example, in each of the above-mentioned embodiments, the measurement for acquiring the tomographic image and the measurement for acquiring the measurement depth related to the tomographic image are executed simultaneously with each other. Results obtained by the respective measurements are stored as a set of data (the x-y tomographic images G1 to GN and the measurement depth results P1 to PN in FIG. 2). However, the present invention is not limited to this. The respective measurements can be performed at different timings. It is also possible that the measurement depth related to the tomographic image is measured over plural times during the measurement of the tomographic image and the movement of the object to be measured is estimated based on a result obtained by the plural-time measurement to correct the measurement depth.

The optical image measuring apparatus according to this embodiment includes both the structure for acquiring information (auxiliary detection signal) used for calculating the measurement depth of the tomographic image and the structure for the structure for calculating the measurement depth based on the acquired information. However, these structures may be separately provided. For example, a structure in which the signal processing portion 20 is not provided can be employed for a modified example of each of the optical image measuring apparatuses 1 and 100 according to the first and second embodiment. In this time, the signal processing portion 20 is composed of, for example, an external computer apparatus provided independently of the optical image measuring apparatus according to the modified example. This optical image measuring apparatus outputs an auxiliary detection signal to the external computer apparatus. When the modified example is employed in the first embodiment, the "acquiring means" in the present invention is composed of the broad-band light source 41, the half mirror 42, the fixed mirror 43, the galvanometer mirror 44, the wavelength filter 45, the diffraction grating 46, and the one-dimensional photo sensor array 47. When the modified example is employed in the second embodiment, the "acquiring means" in the present invention is composed of the beam splitter 71, the diffraction grating 72, and the one-dimensional photo sensor array 73. The reason for this is as follows. That is, the auxiliary detection signal acquired by the acquiring means of the modified example includes information reflecting the measurement depth related to the tomographic image and the measurement depth is acquired based on the auxiliary detection signal, so the auxiliary detection signal can be regarded as the measurement depth. When the modified example is employed, it is unnecessary that the optical image measuring apparatus include the "image forming means" in the present invention. For example, it is possible that the detection signal from the detecting means is outputted to the external computer apparatus or the like and the arrangement processing of the plurality of tomographic images is executed by the computer apparatus or the like.

In the structure shown in FIG. 1 or 7, when a wavelength plate (½-wavelength plate) is provided on the optical path of the signal light S, that is, the optical path between the half mirror 6 and the object to be measured O to correct the tilt of the signal light S in the polarization direction, which is caused by a change in phase of the signal light S propagating through the object to be measured O, the measurement precision can be further improved.

The detecting means of the optical image measuring apparatus according to the present invention are not limited to the above-mentioned CCDs 21 and 22. The detecting means may be a sensor having both a function of detecting the interference light and performing photoelectric conversion thereon and a function of storing detected charges, such as a line sensor including, for example, an integrating circuit. A one-dimensional sensor or a two-dimensional sensor may be used.

In each of the above-mentioned embodiments, the optical image measuring apparatus including the Michelson type interferometer is described. It is also possible to use another interferometer such as a Mach-Zehnder type interferometer (for example, see JP 3245135 B made by the inventors of the present invention).

The structure in the present invention can be also applied to the optical image measuring apparatus for sampling the interference light beams using the shutters as described in JP 2001-330558 A made by the inventors of the present invention. In this case, for example, an additional optical system including the broad-band light source 41, the half mirror 42, the fixed mirror 43, the galvanometer mirror 44, the wavelength filter 45, the diffraction grating 46, and the one-dimensional photo sensor array 47 as shown in FIG. 1 may be provided and the control system as shown in FIG. 2 may be applied. The typical structures of the present invention can be applied to all types of optical image measuring apparatuses, each of which includes the constituents of the present invention described in a scope of the appended claims.

An optical fiber (bundle) used as a light guide member is provided in a part of the interferometer. Therefore, the degree of freedom of an apparatus design can be improved, the apparatus can be made compact, or the degree of freedom of location of the object to be measured can be improved (for example, see JP 3245135 B).

When the optical image measuring apparatus according to the present invention is applied, for example, in ophthalmologic fields, two-dimensional tomographic images of a retina and a cornea can be acquired in addition to the blood flow measurement on the eye fundus. Therefore, it is possible to measure, for example, the number of endothelial cells of the cornea. It is needless to say that various other applications are also possible.

The optical image measuring method according to the present invention can be embodied by, for example, each of the optical image measuring apparatuses according to the present invention as described in detail above.

What is claimed is:

1. An optical image measuring apparatus, comprising:
   dividing means for dividing a light beam outputted from a low-coherent light source into signal light propagating to an object to be measured and reference light propagating to a reference object,
   frequency shifting means for shifting a frequency of the signal light and a frequency of the reference light relative to each other,
   changing means for changing a length of an optical path of the reference light,
   superimposing means for superimposing the signal light propagating through the object to be measured and the reference light propagating through the reference object on each other to produce interference light including a beat frequency based on an amount of the frequency shift,
   detecting means for outputting a detection signal based on the produced interference light, and
   image forming means for forming a tomographic image of the object to be measured which is orthogonal to a propagating direction of the signal light based on the outputted detection signal,
   wherein the optical image measuring apparatus further comprises:
   acquiring means for producing auxiliary interference light from light propagating through the object to be measured, and for acquiring measurement depths in the propagating direction of the signal light which are related to the formed tomographic images of the object to be measured, and
   wherein said acquiring means further comprises:
   wavelength component separating means for separating a plurality of wavelength components from the produced auxiliary interference light;
   auxiliary detection means for receiving the plurality of separated wavelength components and outputting an auxiliary detection signal; and
   measurement depth calculating means for calculating the measurement depth related to the tomographic image based on the detected auxiliary detection signal.

2. An optical image measuring apparatus according to claim 1, further comprising image processing means for arranging a plurality of tomographic images acquired by a change in optical path length of the reference light which is caused by the changing means in a measurement depth direction based on measurement depths related to the plurality of tomographic images which are acquired by the acquiring means.

3. An optical image measuring apparatus according to claim 2, wherein the acquiring means comprises:
   an auxiliary light source for outputting an auxiliary light beam which is low-coherent light;
   auxiliary division means for dividing the outputted auxiliary light beam into auxiliary signal light propagating through the object to be measured and auxiliary reference light propagating through an auxiliary reference object which is fixedly disposed; and
   auxiliary superimposition means for superimposing the auxiliary signal light propagating through the object to be measured and the auxiliary reference light propagating through the auxiliary reference object on each other to produce the auxiliary interference light.

4. An optical image measuring apparatus according to claim 1, wherein the acquiring means comprises:
   an auxiliary light source for outputting an auxiliary light beam which is low-coherent light;
   auxiliary division means for dividing the outputted auxiliary light beam into auxiliary signal light propagating through the object to be measured and auxiliary reference light propagating through an auxiliary reference object which is fixedly disposed; and
   auxiliary superimposition means for superimposing the auxiliary signal light propagating through the object to be measured and the auxiliary reference light propagating through the auxiliary reference object on each other to produce the auxiliary interference light.

5. An optical image measuring apparatus according to claim 4, wherein the acquiring means further comprises combining and separating means for combining the auxiliary signal light separated by the auxiliary division means with the signal light to allow the signal light with which the auxiliary signal light is combined to enter the object to be measured and separating the auxiliary signal light from the signal light propagating through the object to be measured to guide the auxiliary signal light to the auxiliary superimposition means.

6. An optical image measuring apparatus according to claim 3, wherein the acquiring means further comprises combining and separating means for combining the auxiliary signal light separated by the auxiliary division means with the signal light to allow the signal light with which the auxiliary signal light is combined to enter the object to be measured and separating the auxiliary signal light from the signal light propagating through the object to be measured to guide the auxiliary signal light to the auxiliary superimposition means.

7. An optical image measuring apparatus according to claim 5, wherein the acquiring means further comprises scanning means for performing scanning with the auxiliary signal light combined with the signal light by the combining and separating means in a direction orthogonal to a propagating direction of the signal light, and
   the measurement depth calculating means calculates the measurement depth based on a plurality of auxiliary detection signals outputted from the auxiliary detection means in accordance with the scanning with the auxiliary signal light which is performed by the scanning means.

8. An optical image measuring apparatus according to claim 6, wherein the acquiring means further comprises scanning means for performing scanning with the auxiliary signal light combined with the signal light by the combining and separating means in a direction orthogonal to a propagating direction of the signal light, and the measurement depth calculating means calculates the measurement depth based on a plurality of auxiliary detection signals outputted from the auxiliary detection means in accordance with the scanning with the auxiliary signal light which is performed by the scanning means.

9. An optical image measuring apparatus according to claim 7, wherein the scanning means performs the scanning with the auxiliary signal light in a plurality of positions each time when the optical path length of the reference light is changed by the changing means, and the measurement depth calculating means calculates a plurality of measurement depths each corresponding to each of the plurality of positions based on auxiliary detection signals outputted in accordance with the auxiliary signal light for the scanning in the plurality of positions and calculates the measurement depth related to the tomographic image based on the plurality of calculated measurement depths.

10. An optical image measuring apparatus according to claim 8, wherein the scanning means performs the scanning with the auxiliary signal light in a plurality of positions each time when the optical path length of the reference light is changed by the changing means, and the measurement depth calculating means calculates a plurality of measurement depths each corresponding to each of the plurality of positions based on auxiliary detection signals outputted in accordance with the auxiliary signal light for the scanning in the plurality of positions and calculates the measurement depth related to the tomographic image based on the plurality of calculated measurement depths.

11. An optical image measuring apparatus according to claim 7, wherein the scanning means comprises a galvanometer mirror including a reflecting mirror for reflecting the auxiliary signal light and a driver portion for changing an orientation of a reflective surface of the reflecting mirror.

12. An optical image measuring apparatus according to claim 9, wherein the scanning means comprises a galvanometer mirror including a reflecting mirror for reflecting the auxiliary signal light and a driver portion for changing an orientation of a reflective surface of the reflecting mirror.

13. An optical image measuring apparatus according to claim 8, wherein the scanning means comprises a galvanometer mirror including a reflecting mirror for reflecting the auxiliary signal light and a driver portion for changing an orientation of a reflective surface of the reflecting mirror.

14. An optical image measuring apparatus according to claim 10, wherein the scanning means comprises a galvanometer mirror including a reflecting mirror for reflecting the auxiliary signal light and a driver portion for changing an orientation of a reflective surface of the reflecting mirror.

15. An optical image measuring apparatus according to claim 14, wherein the combining and separating means comprises one of a wavelength filter and a beam splitter which is tilted relative to an optical path of the signal light.

16. An optical image measuring apparatus according to claim 12, wherein the combining and separating means comprises one of a wavelength filter and a beam splitter which is tilted relative to an optical path of the signal light.

17. An optical image measuring apparatus according to claim 1, wherein the acquiring means further comprises:

interference light separating means for separating a part of the interference light produced by the superimposing means as the auxiliary interference light from the interference light.

18. An optical image measuring apparatus according to claim 2, wherein the acquiring means further comprises:

interference light separating means for separating a part of the interference light produced by the superimposing means as the auxiliary interference light from the interference light.

19. An optical image measuring apparatus according to claim 17, wherein the interference light separating means comprises a beam splitter tilted relative to an optical path of the interference light produced by the superimposing means.

20. An optical image measuring apparatus according to claim 18, wherein the interference light separating means comprises a beam splitter tilted relative to an optical path of the interference light produced by the superimposing means.

21. An optical image measuring apparatus according to claim 3, wherein wavelength component separating means comprises a diffraction grating.

22. An optical image measuring apparatus according to claim 4, wherein wavelength component separating means comprises a diffraction grating.

23. An optical image measuring apparatus according to claim 11, wherein wavelength component separating means comprises a diffraction grating.

24. An optical image measuring apparatus according to claim 16, wherein wavelength component separating means comprises a diffraction grating.

25. An optical image measuring apparatus according to claim 13, wherein wavelength component separating means comprises a diffraction grating.

26. An optical image measuring apparatus according to claim 15, wherein wavelength component separating means comprises a diffraction grating.

27. An optical image measuring apparatus according to claim 17, wherein wavelength component separating means comprises a diffraction grating.

28. An optical image measuring apparatus according to claim 18, wherein wavelength component separating means comprises a diffraction grating.

29. An optical image measuring apparatus according to claim 19, wherein wavelength component separating means comprises a diffraction grating.

30. An optical image measuring apparatus according to claim 20, wherein wavelength component separating means comprises a diffraction grating.

31. An optical image measuring apparatus according to claim 21, wherein the auxiliary detection means comprises a one-dimensional photo sensor array.

32. An optical image measuring apparatus according to claim 22, wherein the auxiliary detection means comprises a one-dimensional photo sensor array.

33. An optical image measuring apparatus according to claim 23, wherein the auxiliary detection means comprises a one-dimensional photo sensor array.

34. An optical image measuring apparatus according to claim 24, wherein the auxiliary detection means comprises a one-dimensional photo sensor array.

35. An optical image measuring apparatus according to claim 25, wherein the auxiliary detection means comprises a one-dimensional photo sensor array.

36. An optical image measuring apparatus according to claim 26, wherein the auxiliary detection means comprises a one-dimensional photo sensor array.

37. An optical image measuring apparatus according to claim 27, wherein the auxiliary detection means comprises a one-dimensional photo sensor array.

38. An optical image measuring apparatus according to claim 29, wherein the auxiliary detection means comprises a one-dimensional photo sensor array.

39. An optical image measuring apparatus according to claim 28, wherein the auxiliary detection means comprises a one-dimensional photo sensor array.

40. An optical image measuring apparatus according to claim 30, wherein the auxiliary detection means comprises a one-dimensional photo sensor array.

41. An optical image measuring apparatus according to claim 31, wherein the measurement depth calculating means comprises:
wavelength spectrum acquiring means for acquiring a wavelength spectrum of the auxiliary interference light based on the auxiliary detection signal; and
measurement depth information acquiring means for performing Fourier transform on the acquired wavelength spectrum to acquire measurement depth information indicating an intensity distribution of the auxiliary interference light based on the measurement depth, and
the measurement depth calculating means calculates the measurement depth related to the tomographic image formed by the image forming means based on the measurement depth information acquired related to tomographic image.

42. An optical image measuring apparatus according to claim 21, wherein the measurement depth calculating means comprises:
wavelength spectrum acquiring means for acquiring a wavelength spectrum of the auxiliary interference light based on the auxiliary detection signal; and
measurement depth information acquiring means for performing Fourier transform on the acquired wavelength spectrum to acquire measurement depth information indicating an intensity distribution of the auxiliary interference light based on the measurement depth, and
the measurement depth calculating means calculates the measurement depth related to the tomographic image formed by the image forming means based on the measurement depth information acquired related to tomographic image.

43. An optical image measuring apparatus according to claim 32, wherein the measurement depth calculating means comprises:
wavelength spectrum acquiring means for acquiring a wavelength spectrum of the auxiliary interference light based on the auxiliary detection signal; and
measurement depth information acquiring means for performing Fourier transform on the acquired wavelength spectrum to acquire measurement depth information indicating an intensity distribution of the auxiliary interference light based on the measurement depth, and
the measurement depth calculating means calculates the measurement depth related to the tomographic image formed by the image forming means based on the measurement depth information acquired related to tomographic image.

44. An optical image measuring apparatus according to claim 22, wherein the measurement depth calculating means comprises:
wavelength spectrum acquiring means for acquiring a wavelength spectrum of the auxiliary interference light based on the auxiliary detection signal; and
measurement depth information acquiring means for performing Fourier transform on the acquired wavelength spectrum to acquire measurement depth information indicating an intensity distribution of the auxiliary interference light based on the measurement depth, and
the measurement depth calculating means calculates the measurement depth related to the tomographic image formed by the image forming means based on the measurement depth information acquired related to tomographic image.

45. An optical image measuring apparatus according to claim 33, wherein the measurement depth calculating means comprises:
wavelength spectrum acquiring means for acquiring a wavelength spectrum of the auxiliary interference light based on the auxiliary detection signal; and
measurement depth information acquiring means for performing Fourier transform on the acquired wavelength spectrum to acquire measurement depth information indicating an intensity distribution of the auxiliary interference light based on the measurement depth, and
the measurement depth calculating means calculates the measurement depth related to the tomographic image formed by the image forming means based on the measurement depth information acquired related to tomographic image.

46. An optical image measuring apparatus according to claim 34, wherein the measurement depth calculating means comprises:
wavelength spectrum acquiring means for acquiring a wavelength spectrum of the auxiliary interference light based on the auxiliary detection signal; and
measurement depth information acquiring means for performing Fourier transform on the acquired wavelength spectrum to acquire measurement depth information indicating an intensity distribution of the auxiliary interference light based on the measurement depth, and
the measurement depth calculating means calculates the measurement depth related to the tomographic image formed by the image forming means based on the measurement depth information acquired related to tomographic image.

47. An optical image measuring apparatus according to claim 35, wherein the measurement depth calculating means comprises:
wavelength spectrum acquiring means for acquiring a wavelength spectrum of the auxiliary interference light based on the auxiliary detection signal; and
measurement depth information acquiring means for performing Fourier transform on the acquired wavelength spectrum to acquire measurement depth information indicating an intensity distribution of the auxiliary interference light based on the measurement depth, and
the measurement depth calculating means calculates the measurement depth related to the tomographic image formed by the image forming means based on the measurement depth information acquired related to tomographic image.

48. An optical image measuring apparatus according to claim 36, wherein the measurement depth calculating means comprises:
wavelength spectrum acquiring means for acquiring a wavelength spectrum of the auxiliary interference light based on the auxiliary detection signal; and measurement depth information acquiring means for performing Fourier transform on the acquired wavelength spectrum to acquire measurement depth information indicating an intensity distribution of the auxiliary interference light based on the measurement depth, and the measurement depth calculating means calculates the measurement depth related to the tomographic image formed by the image forming means based on the measurement depth information acquired related to tomographic image.

49. An optical image measuring apparatus according to claim 40, wherein the measurement depth calculating means comprises:

wavelength spectrum acquiring means for acquiring a wavelength spectrum of the auxiliary interference light based on the auxiliary detection signal; and measurement depth information acquiring means for performing Fourier transform on the acquired wavelength spectrum to acquire measurement depth information indicating an intensity distribution of the auxiliary interference light based on the measurement depth, and the measurement depth calculating means calculates the measurement depth related to the tomographic image formed by the image forming means based on the measurement depth information acquired related to tomographic image.

50. An optical image measuring apparatus according to claim 39, wherein the measurement depth calculating means comprises:

wavelength spectrum acquiring means for acquiring a wavelength spectrum of the auxiliary interference light based on the auxiliary detection signal; and measurement depth information acquiring means for performing Fourier transform on the acquired wavelength spectrum to acquire measurement depth information indicating an intensity distribution of the auxiliary interference light based on the measurement depth, and the measurement depth calculating means calculates the measurement depth related to the tomographic image formed by the image forming means based on the measurement depth information acquired related to tomographic image.

51. An optical image measuring apparatus according to claim 38, wherein the measurement depth calculating means comprises:

wavelength spectrum acquiring means for acquiring a wavelength spectrum of the auxiliary interference light based on the auxiliary detection signal; and measurement depth information acquiring means for performing Fourier transform on the acquired wavelength spectrum to acquire measurement depth information indicating an intensity distribution of the auxiliary interference light based on the measurement depth, and the measurement depth calculating means calculates the measurement depth related to the tomographic image formed by the image forming means based on the measurement depth information acquired related to tomographic image.

52. An optical image measuring apparatus according to claim 37, wherein the measurement depth calculating means comprises:

wavelength spectrum acquiring means for acquiring a wavelength spectrum of the auxiliary interference light based on the auxiliary detection signal; and measurement depth information acquiring means for performing Fourier transform on the acquired wavelength spectrum to acquire measurement depth information indicating an intensity distribution of the auxiliary interference light based on the measurement depth, and the measurement depth calculating means calculates the measurement depth related to the tomographic image formed by the image forming means based on the measurement depth information acquired related to tomographic image.

53. An optical image measuring apparatus according to claim 41, wherein the measurement depth calculating means compares measurement depth information acquired by the measurement depth information acquiring means in relation to two tomographic images successively formed by the image forming means with each other and calculates a measurement interval between the two tomographic images to acquire a measurement depth.

54. An optical image measuring apparatus according to claim 42, wherein the measurement depth calculating means compares measurement depth information acquired by the measurement depth information acquiring means in relation to two tomographic images successively formed by the image forming means with each other and calculates a measurement interval between the two tomographic images to acquire a measurement depth.

55. An optical image measuring apparatus according to claim 43, wherein the measurement depth calculating means compares measurement depth information acquired by the measurement depth information acquiring means in relation to two tomographic images successively formed by the image forming means with each other and calculates a measurement interval between the two tomographic images to acquire a measurement depth.

56. An optical image measuring apparatus according to claim 44, wherein the measurement depth calculating means compares measurement depth information acquired by the measurement depth information acquiring means in relation to two tomographic images successively formed by the image forming means with each other and calculates a measurement interval between the two tomographic images to acquire a measurement depth.

57. An optical image measuring apparatus according to claim 45, wherein the measurement depth calculating means compares measurement depth information acquired by the measurement depth information acquiring means in relation to two tomographic images successively formed by the image forming means with each other and calculates a measurement interval between the two tomographic images to acquire a measurement depth.

58. An optical image measuring apparatus according to claim 46, wherein the measurement depth calculating means compares measurement depth information acquired by the measurement depth information acquiring means in relation to two tomographic images successively formed by the image forming means with each other and calculates a measurement interval between the two tomographic images to acquire a measurement depth.

59. An optical image measuring apparatus according to claim 47, wherein the measurement depth calculating means compares measurement depth information acquired by the measurement depth information acquiring means in relation to two tomographic images successively formed by the image forming means with each other and calculates a measurement interval between the two tomographic images to acquire a measurement depth.

60. An optical image measuring apparatus according to claim 48, wherein the measurement depth calculating means compares measurement depth information acquired by the measurement depth information acquiring means in relation to two tomographic images successively formed by the image forming means with each other and calculates a measurement interval between the two tomographic images to acquire a measurement depth.

61. An optical image measuring apparatus according to claim 49, wherein the measurement depth calculating means compares measurement depth information acquired by the measurement depth information acquiring means in relation to two tomographic images successively formed by the image forming means with each other and calculates a measurement interval between the two tomographic images to acquire a measurement depth.

62. An optical image measuring apparatus according to claim 50, wherein the measurement depth calculating means compares measurement depth information acquired by the measurement depth information acquiring means in relation to two tomographic images successively formed by the image forming means with each other and calculates a measurement interval between the two tomographic images to acquire a measurement depth.

63. An optical image measuring apparatus according to claim 51, wherein the measurement depth calculating means compares measurement depth information acquired by the measurement depth information acquiring means in relation to two tomographic images successively formed by the image forming means with each other and calculates a measurement interval between the two tomographic images to acquire a measurement depth.

64. An optical image measuring apparatus according to claim 52, wherein the measurement depth calculating means compares measurement depth information acquired by the measurement depth information acquiring means in relation to two tomographic images successively formed by the image forming means with each other and calculates a measurement interval between the two tomographic images to acquire a measurement depth.

65. An optical image measuring method of dividing a light beam outputted from a low-coherent light source into signal light propagating to an object to be measured and reference light propagating to a reference object, shifting a frequency of the signal light and a frequency of the reference light relative to each other, superimposing the signal light propagating through the object to be measured and the reference light propagating through the reference object on each other to produce interference light including a beat frequency based on an amount of the frequency shift, outputting a detection signal based on the produced interference light, and forming a tomographic image of the object to be measured which is orthogonal to a propagating direction of the signal light based on the outputted detection signal, the optical image measuring method comprising the steps of:
  forming a plurality of tomographic images based on a change in optical path length of the reference light;
  acquiring measurement depths in the propagating direction of the signal light which are related to the formed tomographic images of the object to be measured by producing auxiliary interference light from light propagating through the object to be measured, the auxiliary interference light being used for acquiring the measurement depths; and
  arranging the plurality of tomographic images in a measurement depth direction based on the acquired measurement depths related to each of the plurality of tomographic images,
  wherein said acquiring step further comprises:
  separating a plurality of wavelength components from the produced auxiliary interference light;
  receiving the plurality of separated wavelength components and outputting an auxiliary detection signal; and
  calculating the measurement depth related to the tomographic image based on the detected auxiliary detection signal.

66. An optical image measuring method according to claim 65, wherein the acquiring step further comprises the steps of:
  outputting an auxiliary light beam which is low-coherent light;
  dividing the outputted auxiliary light beam into auxiliary signal light propagating through the object to be measured together with the signal light and auxiliary reference light propagating through an auxiliary reference object which is fixedly disposed;
  superimposing the auxiliary signal light propagating through the object to be measured and the auxiliary reference light propagating through the auxiliary reference object on each other to produce auxiliary interference light.

67. An optical image measuring method according to claim 66, wherein the measurement depth acquiring step further comprises the step of performing scanning with the auxiliary signal light in a direction orthogonal to a propagating direction of the signal light, and
  in the measurement depth acquiring step, the measurement depth is calculated based on a plurality of auxiliary detection signals outputted in accordance with the scanning with the auxiliary signal light.

68. An optical image measuring method according to claim 65, wherein the acquiring step further comprises the steps of:
  separating a part of the produced interference light as auxiliary interference light from the interference light.

69. An optical image measuring method according to claim 66, wherein the measurement depth acquiring step comprises the steps of:
  acquiring a wavelength spectrum of the auxiliary interference light based on the auxiliary detection signal; and
  performing Fourier transform on the acquired wavelength spectrum to acquire measurement depth information indicating an intensity distribution of the auxiliary interference light based on the measurement depth, and
  the measurement depth related to the formed tomographic image is calculated based on the measurement depth information acquired related to the tomographic image.

70. An optical image measuring method according to claim 67, wherein the measurement depth acquiring step comprises the steps of:
  acquiring a wavelength spectrum of the auxiliary interference light based on the auxiliary detection signal; and
  performing Fourier transform on the acquired wavelength spectrum to acquire measurement depth information indicating an intensity distribution of the auxiliary interference light based on the measurement depth, and
  the measurement depth related to the formed tomographic image is calculated based on the measurement depth information acquired related to the tomographic image.

71. An optical image measuring method according to claim 68, wherein the measurement depth acquiring step comprises the steps of:

acquiring a wavelength spectrum of the auxiliary interference light based on the auxiliary detection signal; and performing Fourier transform on the acquired wavelength spectrum to acquire measurement depth information indicating an intensity distribution of the auxiliary interference light based on the measurement depth, and the measurement depth related to the formed tomographic image is calculated based on the measurement depth information acquired related to the tomographic image.

* * * * *